US011811462B2

United States Patent
Opshaug et al.

(10) Patent No.: US 11,811,462 B2
(45) Date of Patent: Nov. 7, 2023

(54) BASE STATION LOCATION AND ORIENTATION COMPUTATION PROCEDURE

(71) Applicant: QUALCOMM Incorporated, San Diego, CA (US)

(72) Inventors: Guttorm Ringstad Opshaug, Redwood City, CA (US); Mukesh Kumar, Hyderabad (IN); Yousong Mei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/482,147

(22) Filed: Sep. 22, 2021

(65) Prior Publication Data

US 2023/0087414 A1 Mar. 23, 2023

(51) Int. Cl.
*H04W 24/00* (2009.01)
*H04B 17/27* (2015.01)
*H04W 64/00* (2009.01)

(52) U.S. Cl.
CPC .......... *H04B 17/27* (2015.01); *H04W 64/003* (2013.01)

(58) Field of Classification Search
CPC .............................. H04B 17/27; H04W 64/003
See application file for complete search history.

(56) References Cited

U.S. PATENT DOCUMENTS

| | | | |
|---|---|---|---|
| 2016/0255463 | A1 | 9/2016 | Das et al. |
| 2016/0274215 | A1 | 9/2016 | Edge et al. |
| 2021/0243558 | A1 | 8/2021 | Castagnoli et al. |
| 2022/0014949 | A1* | 1/2022 | Barbu ....................... G01S 1/08 |
| 2022/0171014 | A1* | 6/2022 | Huang .................. H04W 4/023 |

FOREIGN PATENT DOCUMENTS

WO 2022016091 A1 1/2022

OTHER PUBLICATIONS

International Search Report and Written Opinion—PCT/US2022/041161—ISA/EPO—dated Dec. 13, 2022.

* cited by examiner

*Primary Examiner* — Justin Y Lee
(74) *Attorney, Agent, or Firm* — QUALCOMM Incorporated

(57) ABSTRACT

Techniques are provided for utilizing network positioning protocols to perform a base station location and orientation computation procedure. An example method of determining an orientation of a base station antenna with a network server includes receiving measurement values from a base station based on uplink reference signals transmitted by a plurality of reference location devices, obtaining location information for the plurality of reference location devices, and determining the orientation of the base station antenna based on the measurement values and the location information.

30 Claims, 17 Drawing Sheets

BASE STATION LOCATION AND ORIENTATION COMPUTATION PROCEDURE

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Further, the capabilities of UE's may vary and positioning methods may be based on the capabilities of the devices. The accuracy of a location estimate of a UE may be impacted by the configurations of base stations in the network.

SUMMARY

An example method of determining an orientation of a base station antenna with a network server according to the disclosure includes receiving measurement values from a base station based on uplink reference signals transmitted by a plurality of reference location devices, obtaining location information for the plurality of reference location devices, and determining the orientation of the base station antenna based on the measurement values and the location information.

Implementations of such as method may include one or more of the following features. The measurement values may be based on a local coordinate system, and the location information may be based on a global coordinate system. Determining the orientation of the base station antenna may include computing coordinate system transformation values based on the measurement values and the location information. Determining a location of the base station antenna may be based on the measurement values and the location information. An indication of the orientation of the base station antenna may be provided to the base station. An indication of the orientation of the base station antenna may be provided to a user equipment. At least one of the plurality of reference location devices may be a user equipment. A request to determine the orientation of the base station antenna may be received from the base station. The measurement values may include at least an angle of arrival for the uplink reference signals.

An example method for requesting location and orientation information for a base station antenna according to the disclosure includes sending a request to perform an orientation computation procedure to a network entity, measuring a plurality of uplink reference signals transmitted from a plurality of wireless nodes, providing a plurality of uplink reference signal measurement values to the network entity, and receiving coordinate system transformation values from the network entity.

Implementations of such a method may include one or more of the following features. Sending the request to perform the orientation computation procedure periodically. Detecting a calibration event and sending the request to perform the orientation computation procedure in response to detecting the calibration event. At least one of the plurality of wireless nodes may be a user equipment. Providing the coordinate system transformation values to a user equipment.

Items and/or techniques described herein may provide one or more of the following capabilities, as well as other capabilities not mentioned. The location and orientation of a base station antenna may be used to compute the locations of other wireless nodes within the coverage area of the base station. The resulting position estimate for a wireless node may be degraded based on errors associated with the location or orientation data for an antenna. A base station location and orientation computation procedure may be executed periodically or on demand. A network entity, such as a location server, may initiate a positioning protocol to enable network nodes to transmit uplink reference signals and provide location information. The network nodes may be reference location devices. The base station may provide the location server measurement values based on the transmitted uplink reference signals. The location server may determine the location and coordinate system transformation values based on the location information and measurement values. The location and coordinate system transformation values may be used in subsequent positioning sessions to determine the position estimates of other wireless nodes in the network. The accuracy of the position estimates may be improved. Other capabilities may be provided and not every implementation according to the disclosure must provide any, let alone all, of the capabilities discussed.

DETAILED DESCRIPTION

Figure 1:
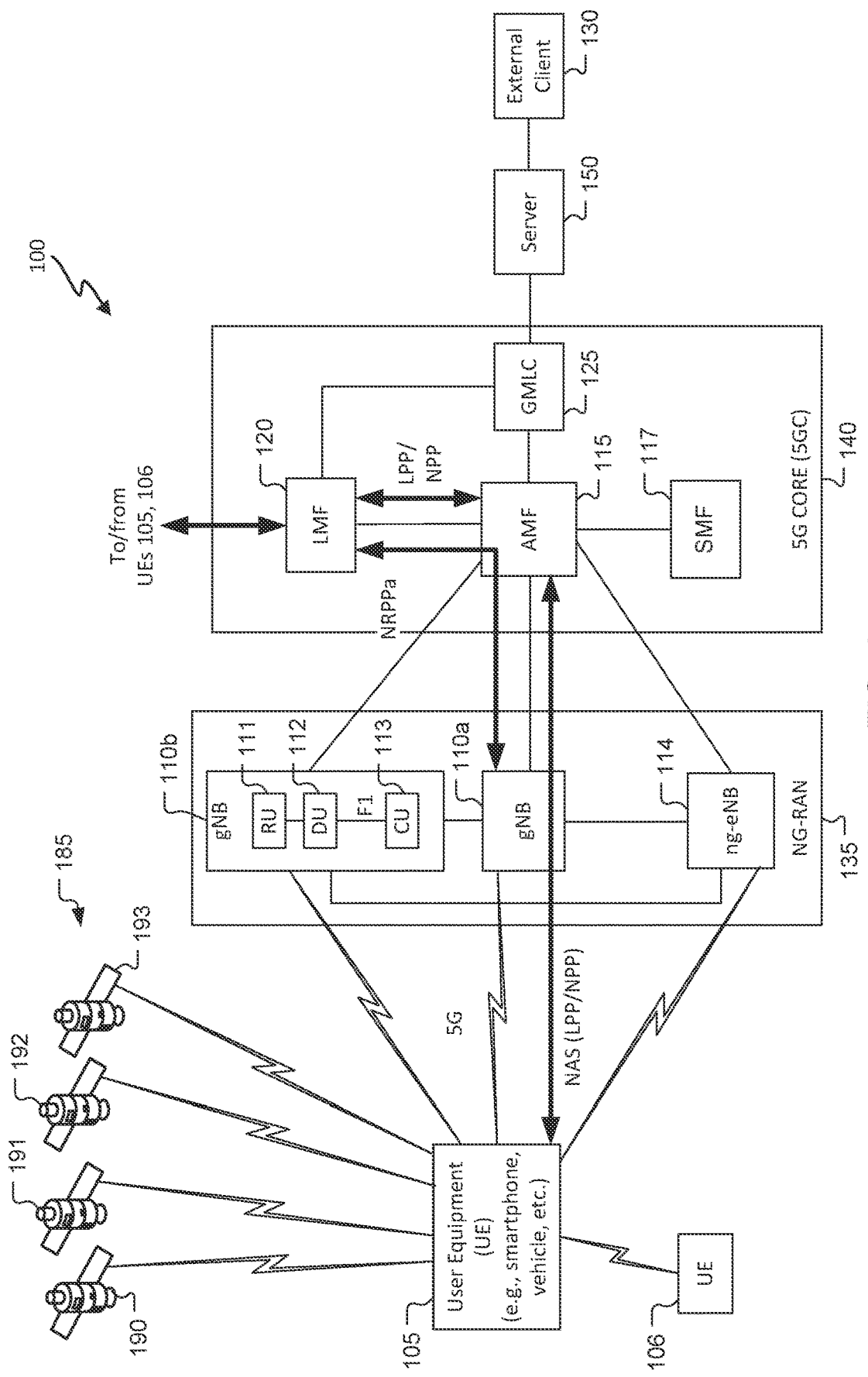
FIG. 1 is a simplified diagram of an example wireless communications system.

Techniques are discussed herein for utilizing network positioning protocols to perform a base station location and orientation computation procedure. A network positioning session may utilize reference signal measurements obtained by wireless nodes such as mobile devices (e.g., user equipment (UE)) and base stations to determine a position estimate for a wireless node. These procedures may utilize the known location of the base station antennas as reference locations to compute the position estimate of other wireless nodes. Historically, the location of the antenna may be obtained through terrestrial surveying techniques such as determining the angle and elevation with a theodolite. These techniques can be labor intensive and cumbersome, and may be impractical for large networks with several base station locations. Further, since many antennas may be installed on buildings, the effectiveness of such techniques may be limited in dense urban settings when the line of sight to a base station antenna may be obstructed by other structures such as rooftop machinery and other buildings. The techniques provided herein may utilize existing positioning protocols to determine the location and orientation of base station antenna installations.

In an example, a base station may send a request to perform the location and orientation computation procedure to a location server. The request may be based on a triggering event (e.g., maintenance, local high winds, positioning performance degradation, etc.) or periodically (e.g., hourly, daily, weekly, etc.). The location server may configure three or more stations with known locations to transmit uplink reference signals to the base station. The base station may determine an angle of arrival (AoA) and elevation angle of arrival (ZoA) for the received reference signals, and report the AoA and ZoA measurements to the location server. The stations with the known locations may also report their locations to the location server. In an example, the location server may be configured to utilize three observations reported by the base station to determine the orientation of the receiving antenna and compute coordinate transformation values to calibrate the local coordinate system (i.e., associated with the antenna's orientation) to a global coordinate system. In an example, the location server may be configured to utilize six observations made by the base station (i.e., from six independent stations) to determine the location and the orientation of a base station antenna. The base station location and orientation information may be used by wireless nodes in subsequent positioning sessions. The accuracy of position estimates for wireless nodes may be increased based on the location and orientation calibration. The labor, costs and delay associated with manually establishing antenna location and orientation may be eliminated. These techniques and configurations are examples, and other techniques and configurations may be used.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
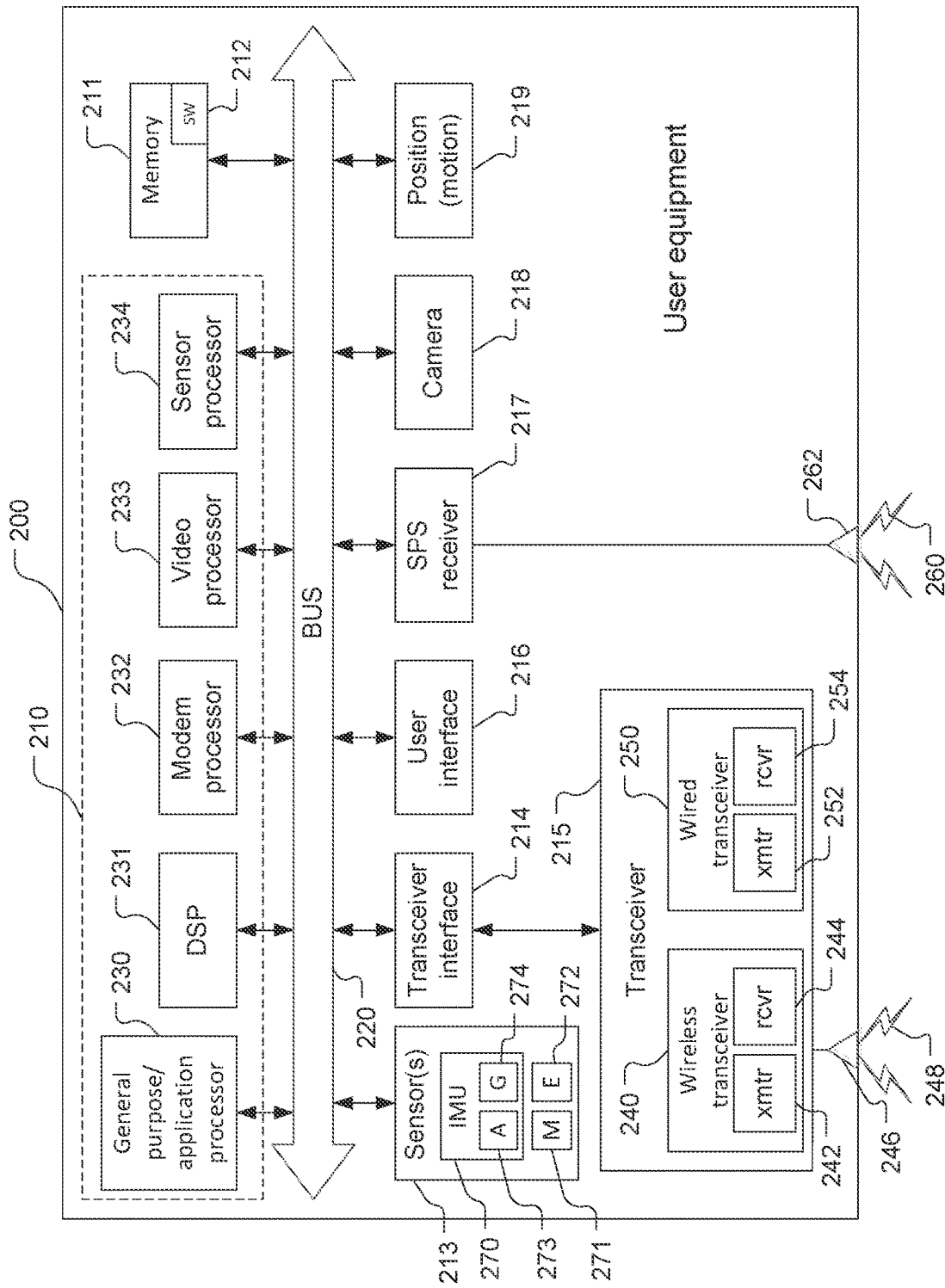
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes one or more wireless transceivers 240, and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer (s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X), PC5, IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
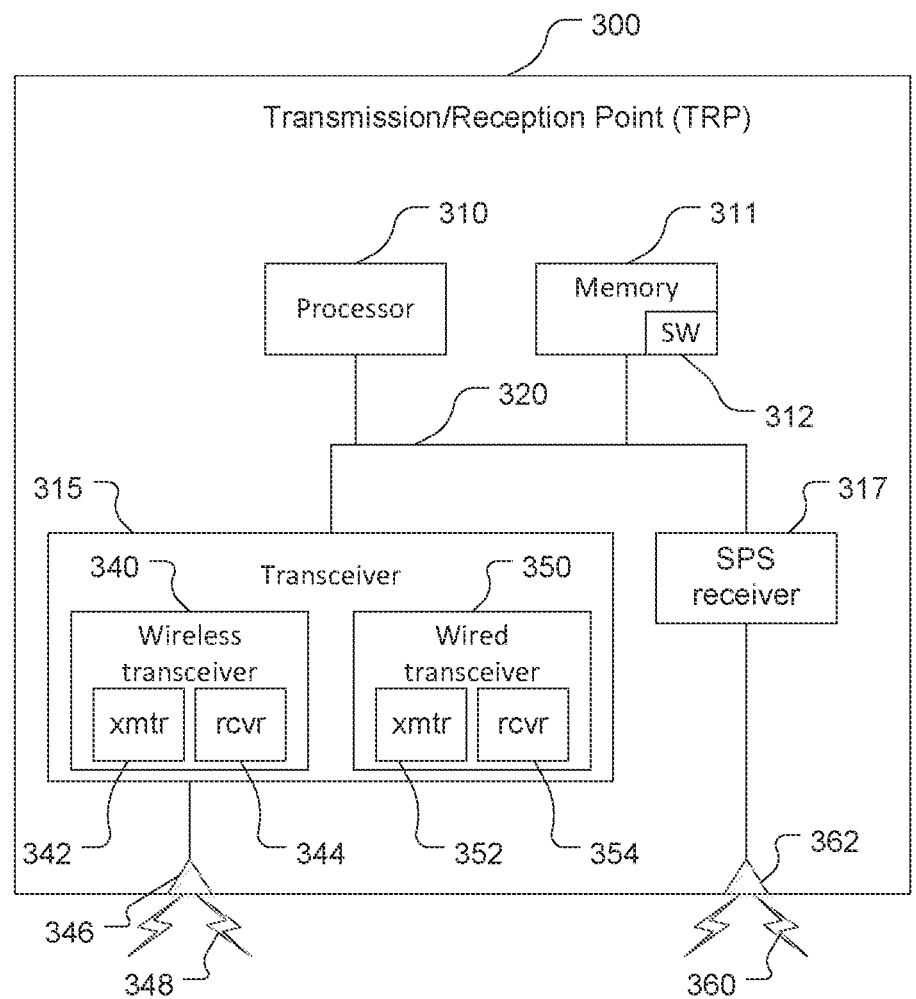
FIG. 3 is a block diagram of components of an example transmission/reception point.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink or downlink channels, and/or one or more sidelink channels) and/or receiving (e.g., on one or more downlink or uplink channels, and/or one or more sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
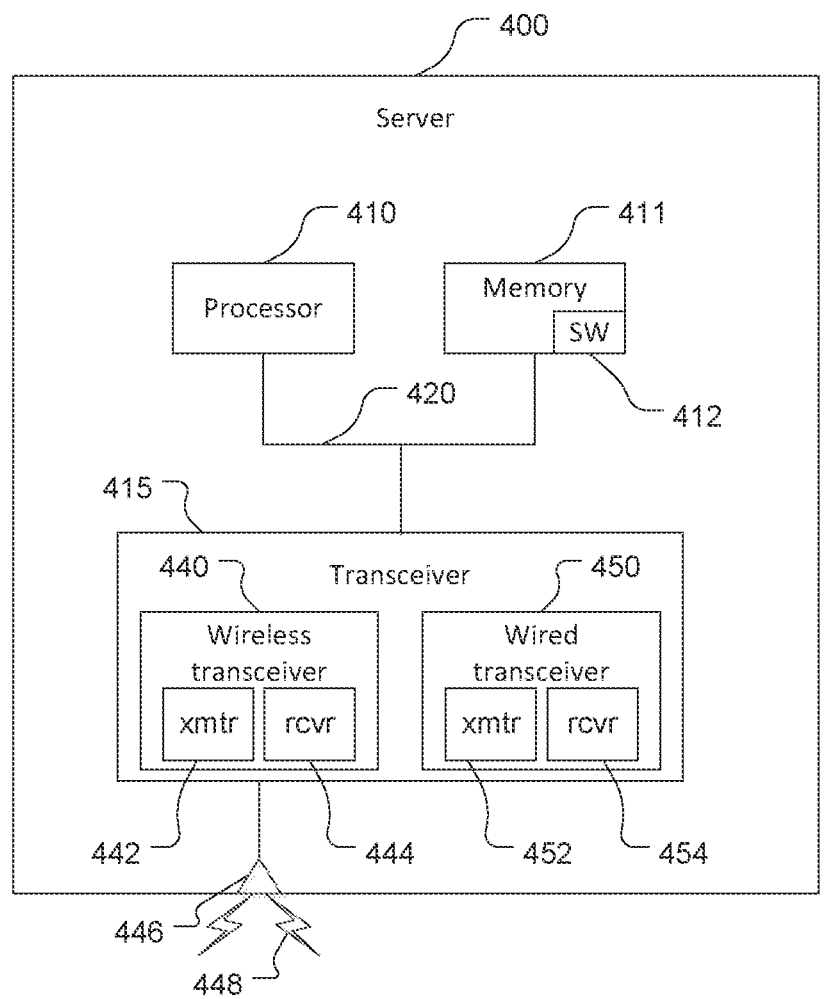
FIG. 4 is a block diagram of components of an example server shown.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

One or more of many different techniques may be used to determine position of an entity such as the UE 105. For example, known position-determination techniques include RTT, multi-RTT, RSTD (e.g., OTDOA, also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In RSTD techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In RSTD, the difference in arrival times at a receiving device of signals from different sources along with known locations of the sources and known offset of transmission times from the sources are used to determine the location of the receiving device.

Figure 5:
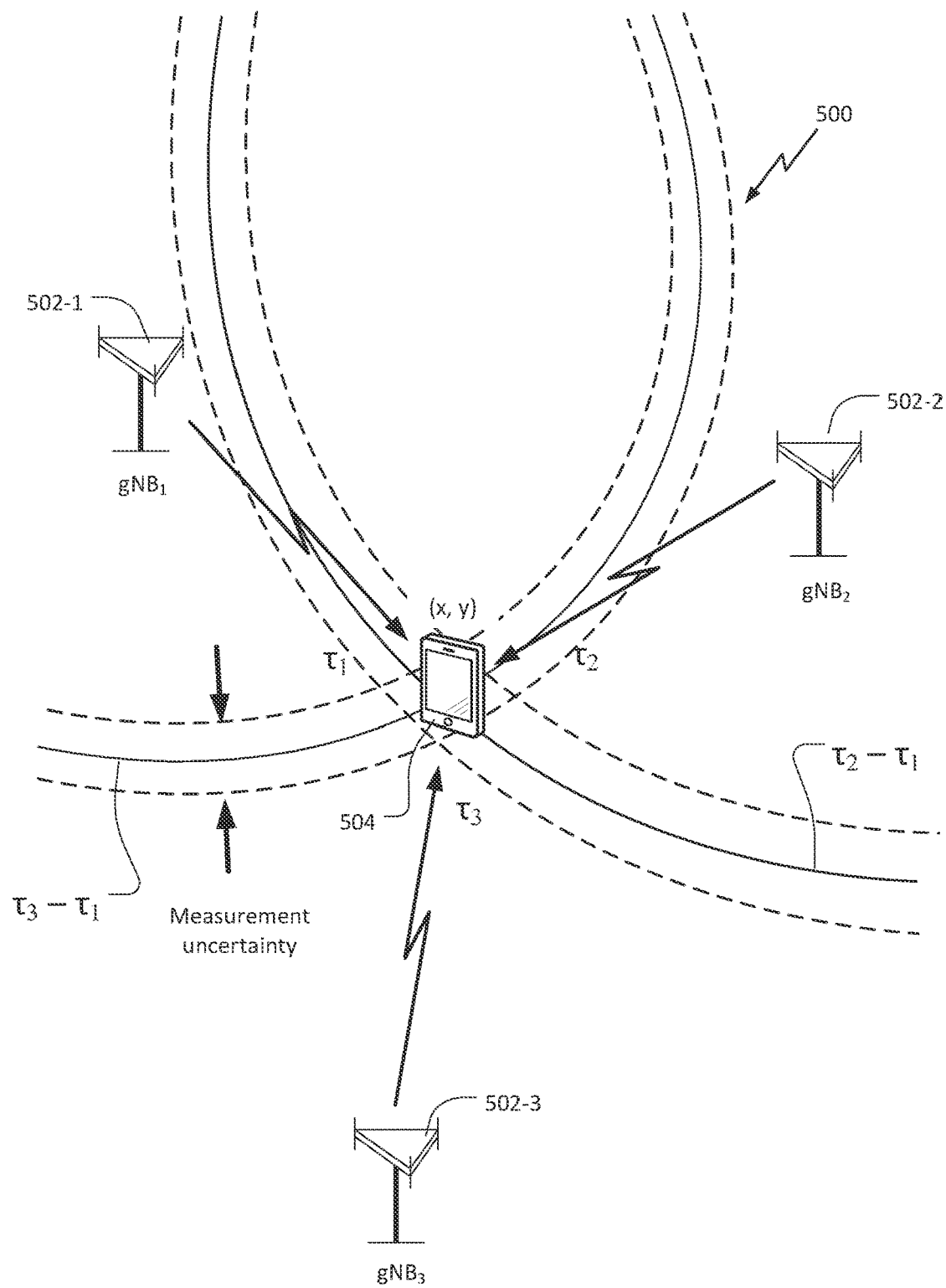
FIGS. 5 and 6 are diagrams illustrating exemplary techniques for determining a position of a mobile device using information obtained from a plurality of base stations.

Referring to FIG. 5, an exemplary wireless communications system 500 according to various aspects of the disclosure is shown. In the example of FIG. 5, a UE 504, which may correspond to any of the UEs described herein, is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, orientation of the antennas, geometry, etc.), the UE 504 may determine its position, or assist in the determination of its position, in a predefined reference coordinate system. In an aspect, the UE 504 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 5 illustrates one UE 504 and three base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the server 400 (e.g., the LMF 120), or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., server 400, LMF 120) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases, OTDOA assistance data may also include "expected RSTD" parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., server 400, LMF 120) may send the assistance data to the UE 504, alternatively, the assistance data can originate directly from the network nodes (e.g., base stations 502) themselves (e.g., in periodically broadcasted overhead messages, etc.). Alternatively, the UE 504 can detect neighbor network nodes itself without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., server 400, LMF 120, a base station 502) or the UE 504 may estimate a position of the UE 504. More particularly, the RSTD for a neighbor network node "k" relative to a reference network node "Ref" may be given as (ToAk-ToARef), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau 2-\tau 1$ and $\tau 3-\tau 1$, where $\tau 1$, $\tau 2$, and $\tau 3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the server 400/LMF 120. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the server 400/LMF 120).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., server 400, LMF 120). In some implementations, a location estimate for the UE 504 may be obtained (e.g., by the UE 504 itself or by the server 400/LMF 120) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS), SRS for positioning signals) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols). Coarse timing synchronization is generally sufficient for Round-trip-time (RTT)-based methods, and the sidelink assisted methods described herein, and as such, are a practical positioning methods in NR.

Figure 6:
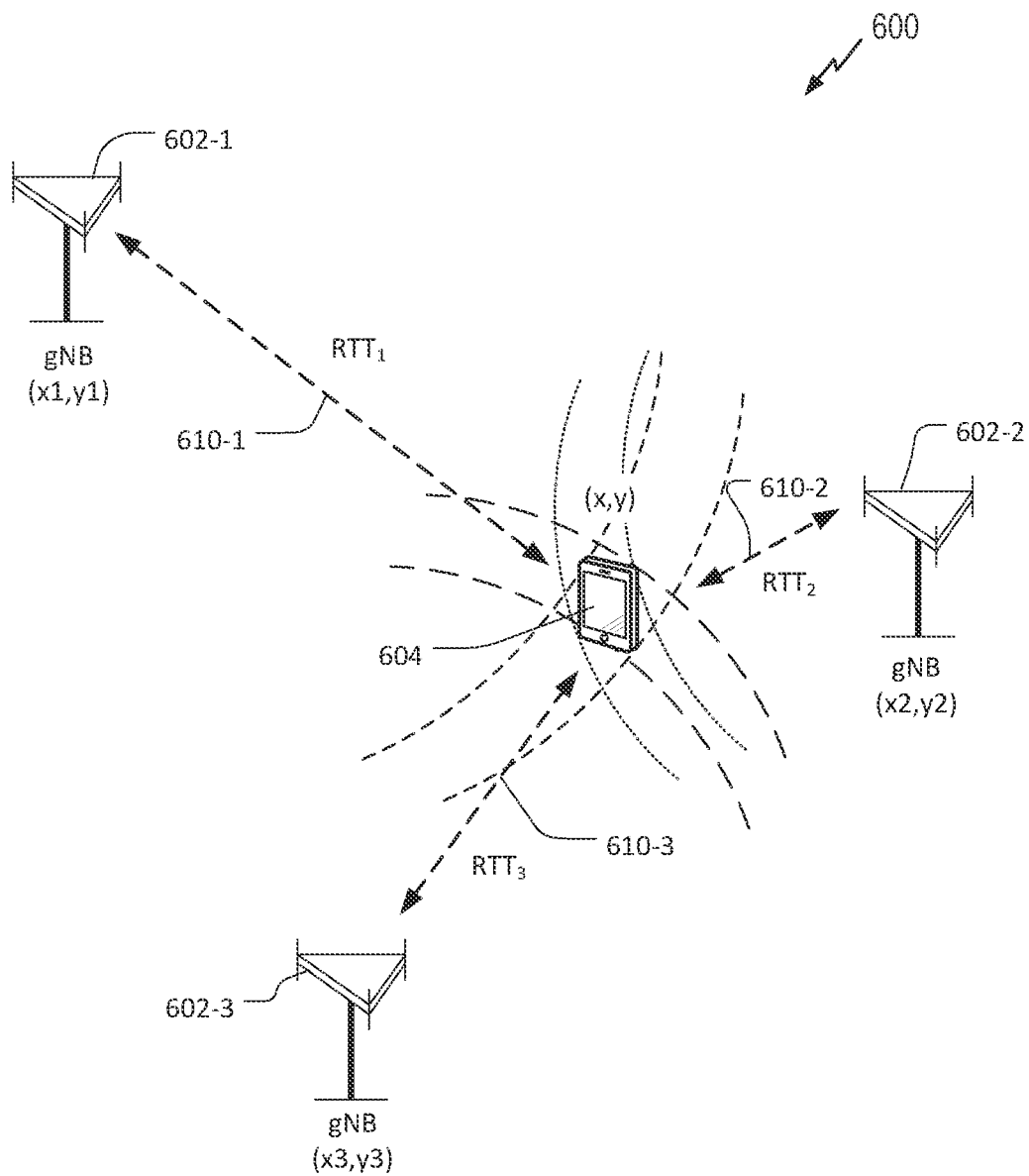

Referring to FIG. 6, an exemplary wireless communications system 600 according to aspects of the disclosure is shown. In the example of FIG. 6, a UE 604 (which may correspond to any of the UEs described herein) is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (which may correspond to any of the base stations described herein) using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and three base stations 602-1, 602-2, 602-3, as will be appreciated, there may be more UEs 604 and more base stations.

To support position estimates, the base stations 602-1, 602-2, 602-3 may be configured to broadcast reference RF signals (e.g., PRS, NRS, CRS, TRS, CSI-RS, PSS, SSS, etc.) to UEs 604 in their coverage area to enable a UE 604 to measure characteristics of such reference RF signals. For example, the UE 604 may measure the ToA of specific reference RF signals (e.g., PRS, NRS, CRS, CSI-RS, etc.) transmitted by at least three different base stations and may use the RTT positioning method to report these ToAs (and additional information) back to the serving base station (e.g., base station 602-2) or another positioning entity (e.g., server 400, LMF 120).

In an aspect, although described as the UE 604 measuring reference RF signals from a base station 602-1, 602-2, 602-3, the UE 604 may measure reference RF signals from one of multiple cells supported by a base station 602-1, 602-2, 602-3. Where the UE 604 measures reference RF signals transmitted by a cell supported by a base station 602-2, the at least two other reference RF signals measured by the UE 604 to perform the RTT procedure would be from cells supported by base stations 602-1, 602-3 different from the first base station 602-2 and may have good or poor signal strength at the UE 604.

In order to determine the position (x, y) of the UE 604, the entity determining the position of the UE 604 needs to know the locations of the base stations 602-1, 602-2, 602-3, which may be represented in a reference coordinate system as ($x_k$, $y_k$), where k=1, 2, 3 in the example of FIG. 6. Where one of the base stations 602-2 (e.g., the serving base station) or the UE 604 determines the position of the UE 604, the locations of the involved base stations 602-1, 602-3 may be provided to the serving base station 602-2 or the UE 604 by a location server with knowledge of the network geometry (e.g., server 400, LMF 120). Alternatively, the location server may determine the position of the UE 604 using the known network geometry.

Either the UE 604 or the respective base station 602-1, 602-2, 602-3 may determine the distance ($d_k$, where k=1, 2, 3) between the UE 604 and the respective base station 602-1, 602-2, 602-3. In an aspect, determining the RTT 610-1, 610-2, 610-3 of signals exchanged between the UE 604 and any base station 602-1, 602-2, 602-3 can be performed and converted to a distance ($d_k$). RTT techniques can measure the time between sending a signaling message (e.g., reference RF signals) and receiving a response. These methods may utilize calibration to remove any processing and hardware delays. In some environments, it may be assumed that the processing delays for the UE 604 and the base stations 602-1, 602-2, 602-3 are the same. However, such an assumption may not be true in practice.

Once each distance $d_k$ is determined, the UE 604, a base station 602-1, 602-2, 602-3, or the location server (e.g., server 400, LMF 120) can solve for the position (x, y) of the UE 604 by using a variety of known geometric techniques, such as, for example, trilateration. From FIG. 6, it can be seen that the position of the UE 604 ideally lies at the common intersection of three semicircles, each semicircle being defined by radius $d_k$ and center ($x_k$, $y_k$), where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 604 from the location of a base station 602-1, 602-2, 602-3). The intersection of the two directions at or near the point (x, y) can provide another estimate of the location for the UE 604.

A position estimate (e.g., for a UE 604) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 7:
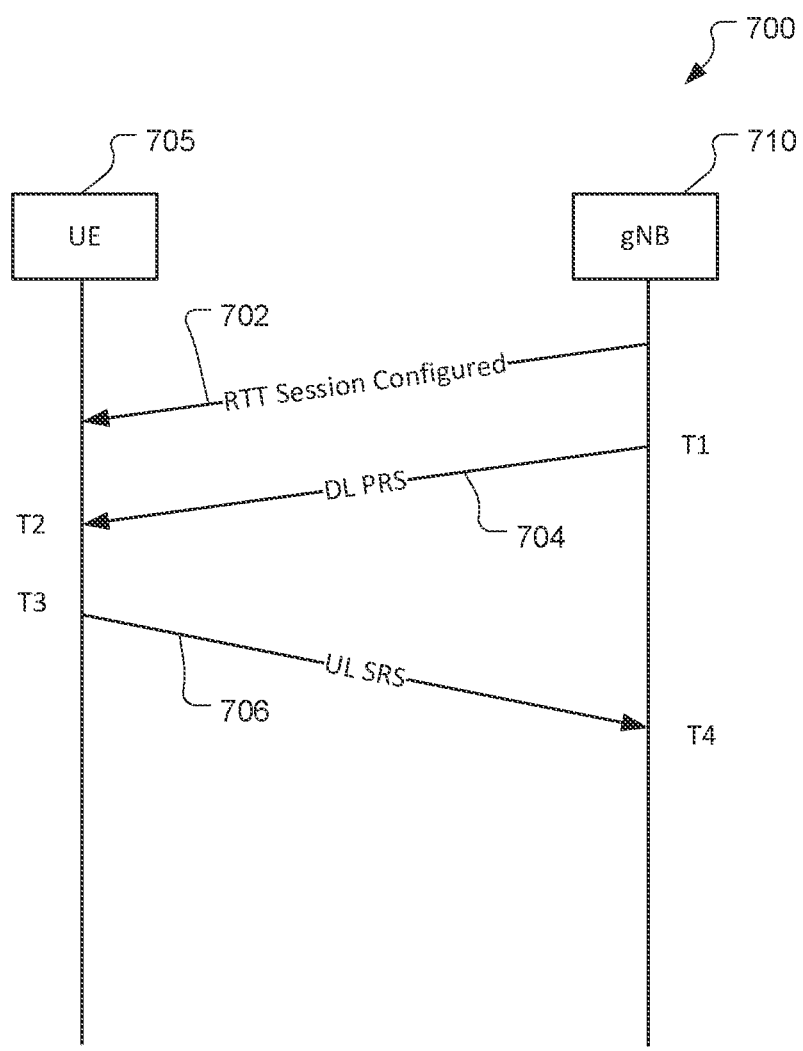
FIG. 7 is an example round trip message flow between a user equipment and a base station.

Referring to FIG. 7, an example round trip message flow 700 between two wireless nodes such as a user equipment 705 and a base station 710 is shown. The UE 705 is an example of the UE 105, 200 and the base station 710 may be a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 700 may be initiated by the base station 710 with a RTT session configure message 702. The base station may utilize the LPP/NRPPa messaging to configure the RTT session. At time T1, the base station 710 may transmit a DL PRS 704, which is received by the UE 705 at time T2. In response, the UE 705 may transmit a Sounding Reference Signal (SRS) for positioning message (e.g., UL-SRS) 706 at time T3 which is received by the base station 710 at time T4. The distance between the UE 705 and the base station 710 may be computed as:

$$\text{distance} = \frac{c}{2}((T4 - T1) - (T3 - T2)) \qquad (1)$$

where c=speed of light.

In operation, the accuracy of the distance measurement, and a corresponding position estimate, are based on the known location of one of the two stations (e.g., UE 705 or the base station 710). In a mission mode, the location UE 705 is unknown and the RTT session is performed in an effort to compute a position estimate for the UE 705. In a calibration mode, the location of the UE 705 is known and the RTT session is performed in an effort to compute a location and orientation of the antennas associated with the base station 710. In an example, the base station 710 may have a remote radio head, or other antenna installation which may be moved or misaligned during maintenance or due to environmental conditions (e.g., high winds). The location and orientation computation procedures provided herein may utilize the calibration mode with multiple UEs to determine the location and orientation of the base station 710, which may then improve the accuracy of position estimates for subsequent measurements obtained in the mission mode.

Figure 8:
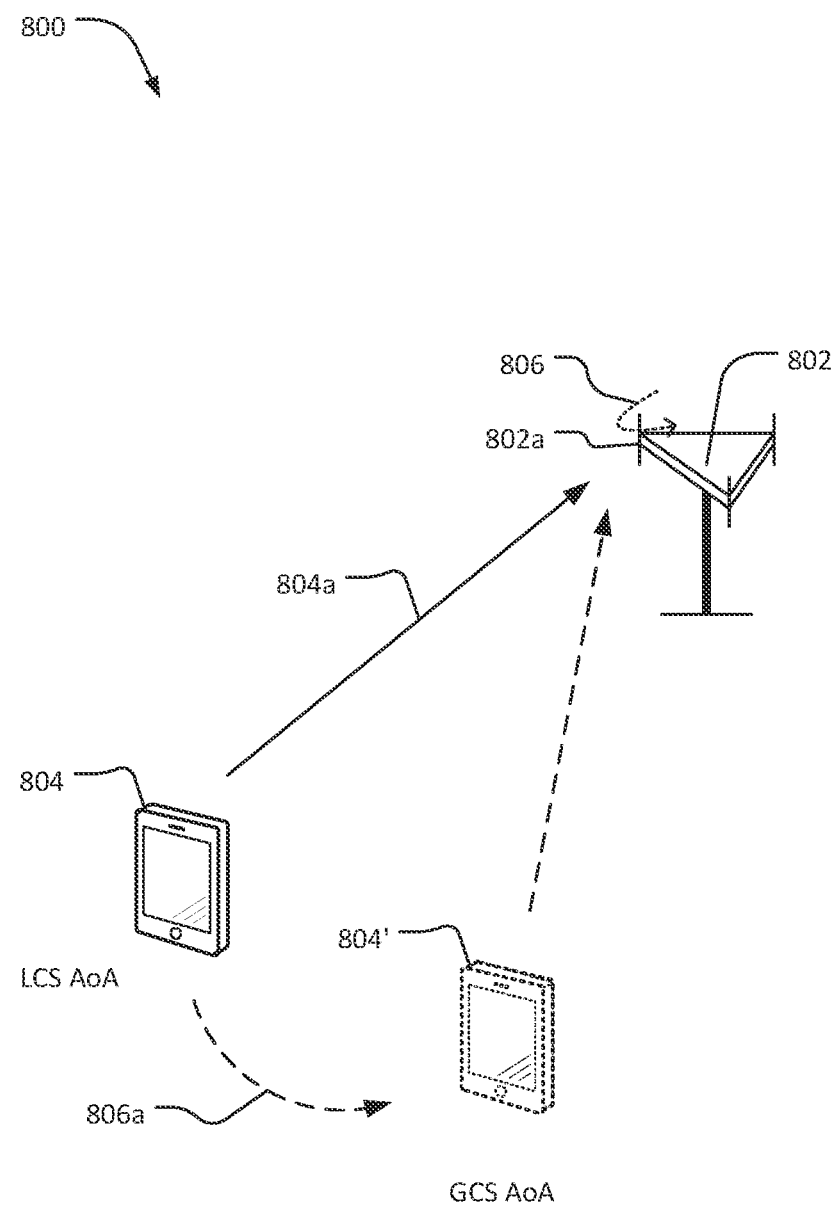
FIG. 8 is a diagram of an example impact of an antenna misalignment.

Referring to FIG. 8, a diagram 800 of an example impact of an antenna misalignment is shown. The diagram 800 includes a base station (BS) 802 and a UE 804. The BS 802 may have one or more antenna elements such as the antenna element 802a. In operation, the UE 804 may transmit UL-SRS for positioning messages 804a which are receive and measured by the BS 802. In an example, a location server (or other network entity) may utilize measurements such as RTT and AoA to determine a range and bearing from the BS 802 to the UE 804 based on a local coordinate system (LCS). The LCS, may be different from a global coordinate system (GCS) due to alignment and location differences in the antenna element 802a relative to the GCS. For example, a misalignment 806 in the antenna element 802a may cause a displacement 806a in the computed position estimate of the UE 804. Specifically, the position estimate of the UE 804 in the LCS may be improved when the misalignment 806 is applied to determine the position estimate of the UE 804' in the GCS. A calibrated location of the BS 802 may also be used to improve the position estimate in the GCS based on the potential impact of the range computations.

Figure 9:
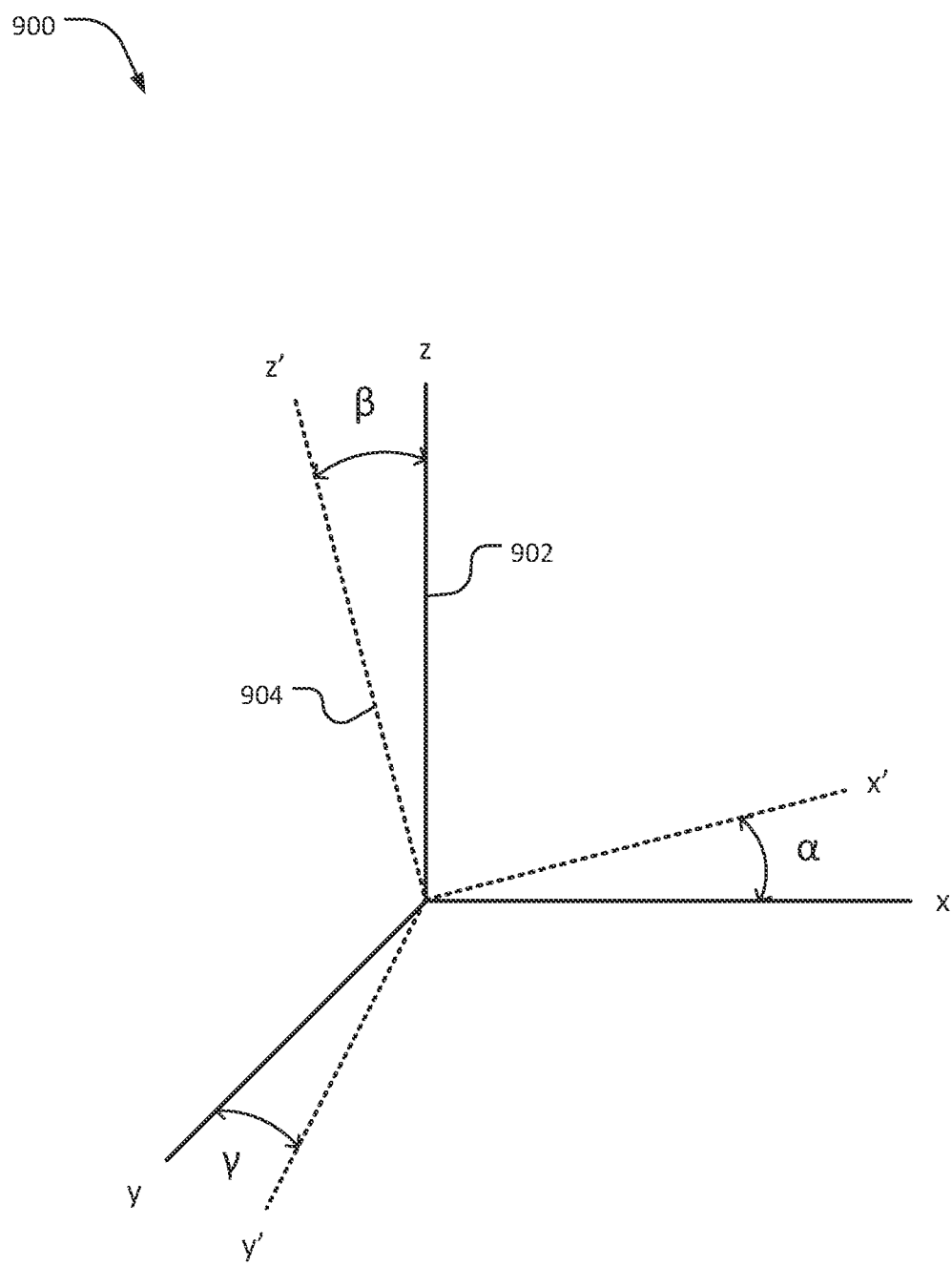
FIG. 9 is a diagram of an example transformation from a local coordinate system to a global coordinate system.

Referring to FIG. 9, a diagram 900 of an example transformation from a LCS to a GCS is shown. In general, a GCS 902 is defined for a system comprising multiple BSs and UEs. An array antenna for a BS or a UE can be defined in a LCS 904. The LCS 904 is used as a reference to define the vector far-field that is pattern and polarization, of each antenna element in an array. The far-field may be known in the LCS by formula. The placement of an array within the GCS 902 is defined by the translation between the GCS and a LCS. The orientation of the array with respect to the GCS is defined in general by a sequence of rotations (e.g., described in 3GPP TR 38.901, clause 7.1.3 V16.1.0 (2019 December)). Since this orientation is in general different from the GCS orientation, it is necessary to map the vector fields of the array elements from the LCS to the GCS. This mapping depends on the orientation of the array and is given by the equations in clause 7.1.3. In an example, an arbitrary mechanical orientation of the array can be achieved by rotating the LCS 904 with respect to the GCS 902. An arbitrary 3D-rotation of the LCS 904 with respect to the GCS 902 may be defined by the angles alpha ($\alpha$), beta ($\beta$), gamma ($\gamma$). The set of angles $\alpha$, $\beta$, $\gamma$ can also be termed as the orientation of the array antenna with respect to the GCS. The transformation from the LCS 904 to a GCS 902 may depend on the angles $\alpha$, $\beta$, $\gamma$. The angle $\alpha$ may be referred to as the bearing angle, $\beta$ may be referred to as the down tilt angle, and $\gamma$ may be referred to as the slant angle.

Figure 10:
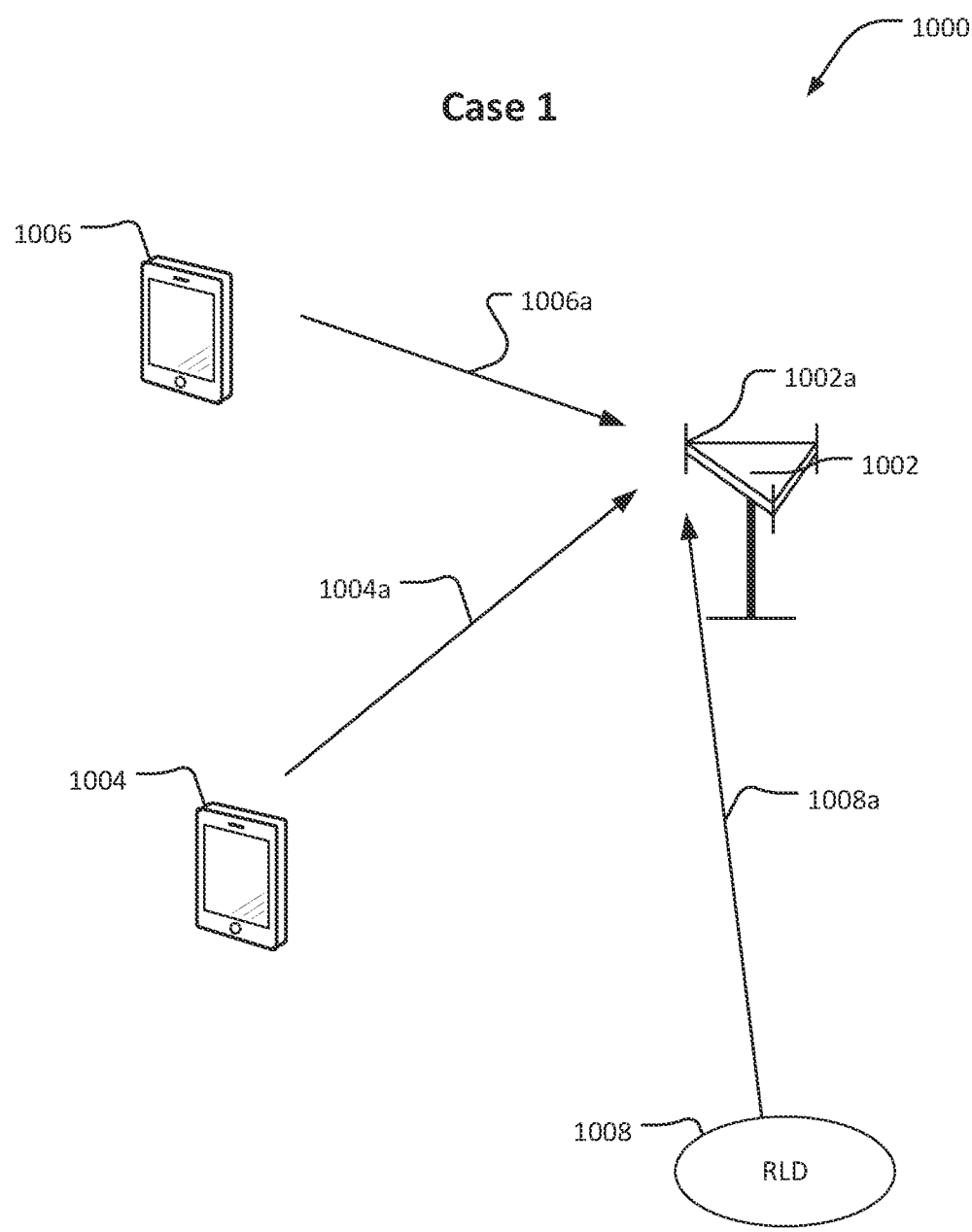
FIG. 10 is an example use case to determine an orientation of a base station.

Referring to FIG. 10, an example use case 1000 to determine an orientation of a base station is shown. The use case includes a BS 1002 with at least one antenna array 1002a. The location of the antenna array 1002a is known, but the orientation is not known. The BS 1002 may be configured to obtain three observations to estimate the angles alpha ($\alpha$), beta ($\beta$), gamma ($\gamma$) described in FIG. 9 based on observations of relative UE locations with respect to the antenna array 1002a in a GCS, and the AoA and ZoA measurements in the LCS. Three independent UEs and/or reference location devices (RLDs) in different locations may provide uplink reference signals (e.g., UL-SRS, UL-SRS for positioning) to be measured by the BS 1002. For example, a first UE 1004 may transmit a first reference signal 1004a, a second UE 1006 may transmit a second reference signal 1006a, and a reference location device (RLD) 1008 may transmit a third reference signal 1008a. The RLD may be a UE, a BS, or other station with a known location and configured to send and receive reference signals used for positioning. In V2X network, the RLD may be a roadside unit (RSU). The UEs and RLDs are at known locations established by GNSS, PPP, RTK, or other terrestrial techniques. The number and locations of the UEs and RLD are examples and not limitations, other combinations and locations may be used. In an example, the UEs and/or RLDs may be selected based on a dilution of precision (DOP) process as known in the art. In an example, the reference signals 1004a, 1006a, 1008a may be transmitted in a positioning session initiated by a network server, such as the LMF 120. The BS 1002 may report the respective AoA and ZoA measurements for each of the reference signals 1004a, 1006a, 1008a to the LMF. Other reference signal measurements such as RTT, ToA, TDoA, RSRP, RSRQ, RSTD, ULTDOA, etc., may also be obtained by the BS 1002 and reported to the LMF 120. The UEs 1004, 1006 and the RLD 1008 may report their current location and, in an example, other reference signal measurements (e.g., RTT, RSTD, ToA, etc.) associated with the BS 1002 to the LMF 120. The LMF 120 may utilize the locations of the UEs 1004, 1006 and the RLD 1008 to establish the GCS for the BS 1002, and then determine the coordinate system transformation values (e.g., alpha ($\alpha$), beta ($\beta$), gamma ($\gamma$)) based on the LCS AoA and ZoA measurements reported by the BS 1002. The LMF 120 may then be configured to apply the coordinate system transformation values to future measurements obtained by the BS 1002 during UE positioning sessions. In an example, the LMF 120 may propagate the coordinate system transformation values to the BS 1002 and other UEs, and the transformations may be applied locally.

Figure 11:
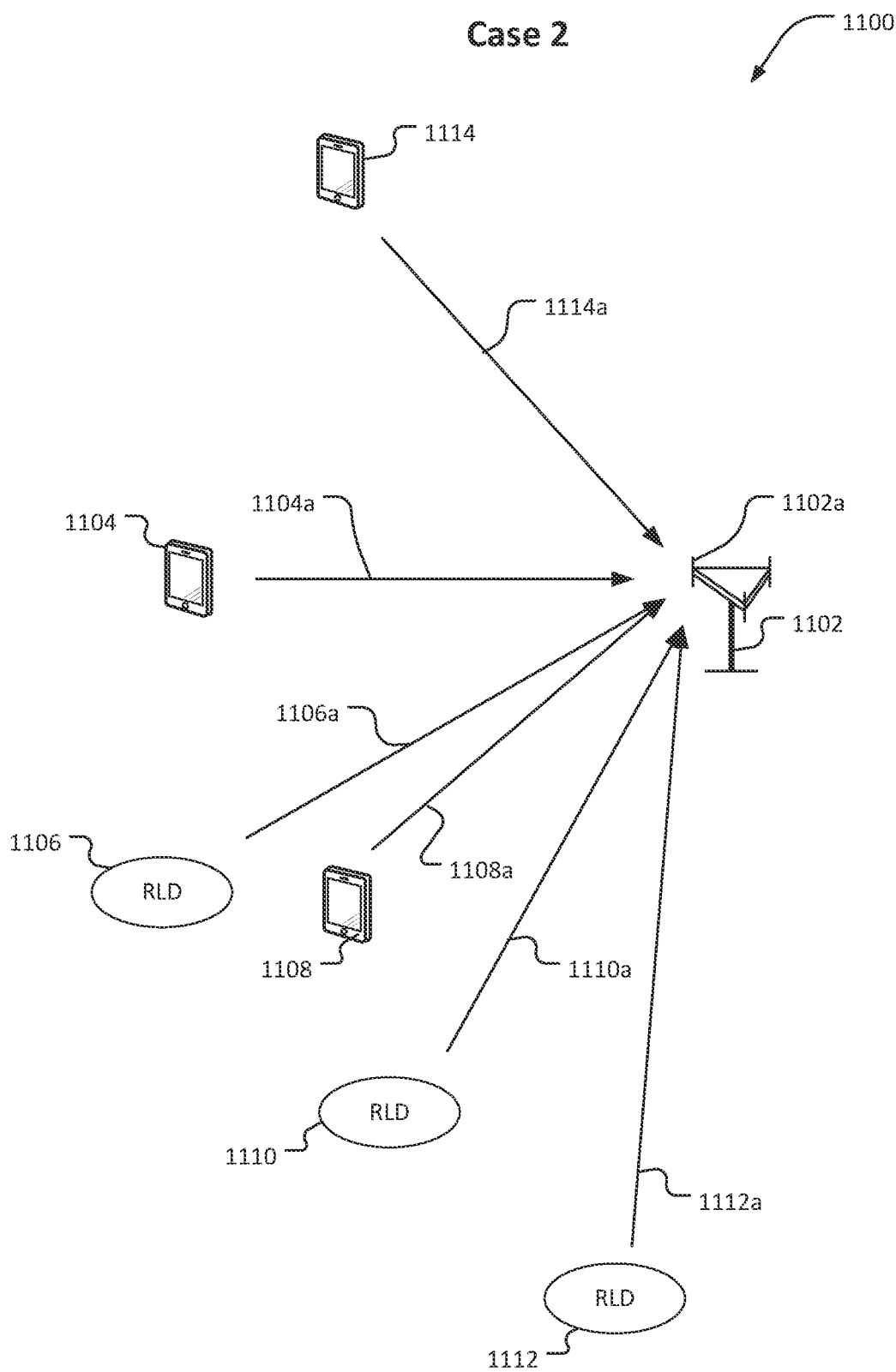
FIG. 11 is an example use case to determine a location and an orientation of a base station.

Referring to FIG. 11, an example use case 1100 to determine a location and an orientation of a base station is shown. The use case includes a BS 1102 with at least one antenna element 1102a. In the use case 1100, but the location and the orientation of the antenna array 1002a are unknown. The BS 1102 may be configured to obtain six observations to estimate the angles alpha ($\alpha$), beta ($\beta$), gamma ($\gamma$) described in FIG. 9 based on observations of relative UE locations with respect to the antenna element 1102a in a GCS, and the AoA and ZoA measurements in the LCS. Six independent UEs and/or reference location devices (RLDs) in different locations may provide uplink reference signals to be measured by the BS 1102. For example, a first UE 1104 may transmit a first reference signal 1104a, a second UE 1108 may transmit a second reference signal 1108a, and a third UE 1114 may transmit a third reference signal 1114a. A first RLD 1106 may transmit a fourth reference signal 1106a, a second RLD 1110 may transmit a fifth reference signal 1110a, and a third RLD 1112 may transmit a sixth reference signal 1112a. As in the use case 1000, the RLDs may be UEs, BSs, or other stations with a known location and configured to send and receive reference signals used for positioning. The number and locations of the UEs and RLDs are examples and not limitations, other combinations and locations may be used. In an example, the UEs and/or RLDs may be selected based on a dilution of precision (DOP) process as known in the art. In an example, the reference signals 1104a, 1106a, 1108a, 1110a, 1112a, 1114a may be transmitted in a positioning session initiated by a network server, such as the LMF 120. The BS 1102 may report the respective AoA and ZoA measurements for each of the reference signals to the LMF 120. Other reference signal measurements such as RTT, ToA, ULTDOA, RSRP, RSRQ, RSTD, may also be obtained by the BS 1102 and reported to the LMF 120. The UEs and the RSDs may report their current location and, in an example, other reference signal measurements (e.g., RTT, RSTD, ToA, etc.) associated with the BS 1102 to the LMF 120. The LMF 120 may utilize the locations of the UEs and the RLDs and the signal measurements to determine the location of the antenna element 1102a, and establish the GCS for the BS 1102. The LMF 120 may then determine the coordinate system transformation values (e.g., alpha ($\alpha$), beta ($\beta$), gamma ($\gamma$)) based on the LCS AoA and ZoA measurements reported by the BS 1102. The location and orientation information may be applied to subsequent mission-mode positioning sessions by the LMF 120, or other network nodes.

Figure 12:
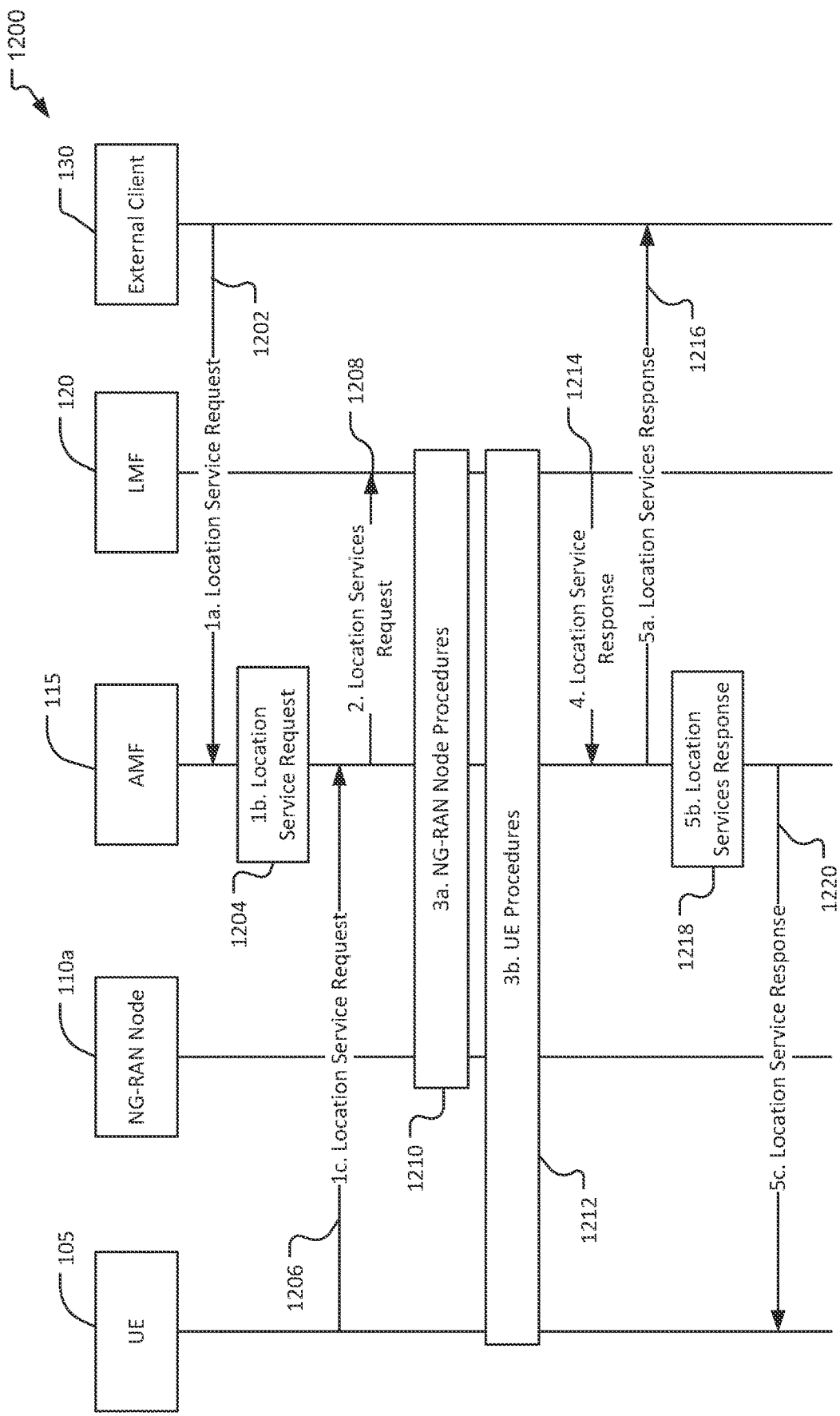
FIG. 12 is an example message flow for determining location information for a user equipment.

Referring to FIG. 12, with further reference to FIG. 1, an example message flow 1200 for determining location information for a user equipment is shown. The flow 1200 is an example, as stages may be added, rearranged, and/or removed. The message flow 1200 may include the UE 105, a serving station such as the gNB 110a, the AMF 115, the LMF 120, and one or more LCS entities and/or external clients 130. In an embodiment, the external client 130 may provide a location service request message 1202 to the LMF 120 and/or the AMF 115. In an example, the AMF 115 may initiate a location service request at stage 1204. The UE 105 may also be configured to send a location service request 1206 to the AMF 115 to initiate a positioning session. The AMF 115 may provide a location service request message 1208 to the LMF 120. At stage 1210, the LMF 120 may be configured to perform NG-RAN Node procedures such as sending and receiving reference signal configuration information to and from a plurality of network nodes including the gNB 110a. In an example, the LMF 120 may request positioning capabilities from the UE 105 via one or more LPP messages. The LMF 120 may also request UL-SRS configuration information for the UE 105 from the gNB 110a. The LMF 120 may provide assistance data to the gNB 110a including reference signal transmission properties such as a pathloss reference, spatial relation information, Synchronization Signal Block (SSB) configuration information, or other information required by the gNB 110a to determine a range and/or bearing to the UE 105. The gNB 110a may be configured to determine the resources available for UL-SRS and configured the UE 105 with UL-SRS resource sets. The gNB 110a may also provide the UL-PRS configuration parameters to the UE 105 in one or more Radio Resource Control (RRC) messages, and provide the UL-PRS configuration parameters to the LMF 120.

At stage 1212, the LMF 120 may send a NRPPa Positioning Activation Request message to the gNB 110a to request activation of the UL-PRS in the UE 105 according to one or more configurations provided to the UE 105 at stage 1210. The gNB 110a may send an activation signal, such as a MAC Control Element, to the UE 105 to activate the UL-PRS. The LMF 120 may send a NRPPa Measurement Request message to the gNB 110a, and neighboring stations, to request UL-PRS measurements. The LMF 120 may provide assistance data to the UE 105 in a LPP assistance data messages, and send LPP request location information messages to obtain location information from the UE 105. The UE 105 may acquire and measure DL-PRS transmitted by the gNB 110a, and neighboring stations. The gNB 110a may acquire and measure the UL-PRS transmitted by the UE 105. The LMF 120 may provide a location service response message 1214 indicating the location of the UE 105 based on the measurements obtained at stage 1212. The AMF 115 may be configured to provide the location information to the external client 130 with a location service response message 1216, and/or to the UE 105 with a location services response message 1220. The AMF may also use the location services response at stage 1218.

Figure 13:
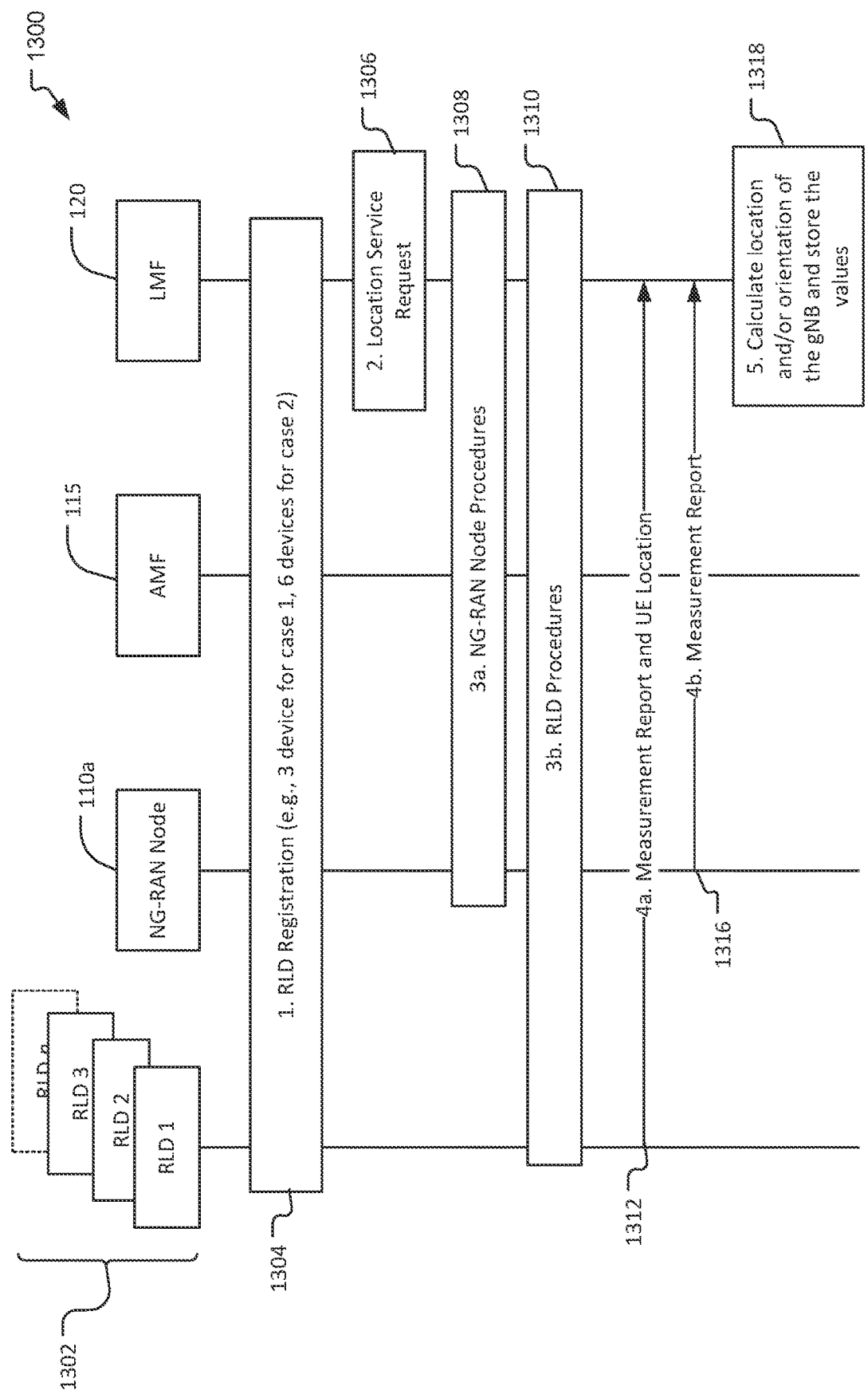
FIG. 13 is an example message flow for performing a base station location and orientation computation procedure.

Referring to FIG. 13, with further reference to FIGS. 1-12, an example message flow 1300 for performing a base station location and orientation computation procedure is shown. The message flow 1300 may utilize the positioning protocols discussed in the message flow 1200 for determining the location and orientation of a base station. The flow 1300 is an example, as stages may be added, rearranged, and/or removed. The message flow 1300 may include a plurality of RLDs 1302, a station requiring calibration such as the gNB 110*a*, the AMF 115, and the LMF 120. The RLDs 1302 may include UEs and other network nodes in known locations configured to transmit reference signals to the gNB 110*a*. In an example, a network station such the LMF 120 may initiate the BS location and orientation computation procedure. The message flow 1300 may be initiated via scheduling operation (e.g., periodically) and/or based on event triggers (e.g., outlier detection based on positioning sessions with multiple stations). In a crowdsourcing use case, a network server may be configured to provide a time-window for the location and orientation procedure. An initial crowdsource target time within the time-window may be set for a first calibration event, and the target time may be randomized in subsequent time-windows. At stage 1304, the LMF 120 is configured to select a plurality of RLDs 1302 to provide reference signals to the gNB 110*a*. Referring to FIG. 10, three RLDs 1302 may be selected to perform an orientation procedure if the location of the gNB 110*a* (e.g., an antenna array of the gNB 110*a*) is known. The LMF 120 may utilize DOP procedures to select the RLDs. In an example, referring to FIG. 11, six RLDs 1302 may be selected to determine the location and orientation of the gNB 110*a*. At stage 1306, the LMF 120 may be configured to initiate a location service request to enable the gNB 110*a* to obtain reference signal measurements from the RLDs 1302.

At stage 1308, the LMF 120 may be configured to perform NG-RAN Node procedures such as sending and receiving PRS configuration information to and from a plurality of RLDs 1302 and the gNB 110*a*. In an example, the LMF 120 may request positioning capabilities from the RLDs 1302 via one or more LPP messages. The LMF 120 may also request UL-SRS configuration information for the RLDs 1302 from the gNB 110*a*. The LMF 120 may provide assistance data to the gNB 110*a* including reference signal transmission properties such as a pathloss reference, spatial relation information, SSB configuration information, or other information required by the gNB 110*a* to determine ranges and/or bearings to the RLDs 1302. The gNB 110*a* may be configured to determine the resources available for UL-SRS and configured the RLDs 1302 with UL-SRS resource sets. In an example, the gNB 110*a* may also provide the UL-PRS configuration parameters to the RLDs 1302 in one or more Radio Resource Control (RRC) messages, and provide the UL-SRS configuration parameters to the LMF 120.

At stage 1310, the LMF 120 may send a NRPPa Positioning Activation Request message to the gNB 110*a* to request activation of the UL-SRS in the RLDs 1302. The gNB 110*a* may send activation signals, such as MAC Control Elements, to the RLDs 1302 to activate the UL-SRS. The LMF 120 may send a NRPPa Measurement Request message to the gNB 110*a* to request UL-SRS measurements associated with the RLDs 1302. In an example, the LMF 120 may provide assistance data to the RLDs 1302 in LPP assistance data messages, and send LPP request location information messages to obtain location information from the RLDs 1302. Each of the RLDs 1302 may provide measurement report and location information messages 1312 to the LMF 120. The gNB 110*a* may provide the LMF 120 with measurement values associated with the UL-SRS transmitted by the RLDs 1302 in one or more measurement report messages 1316.

At stage 1318, the LMF 120 may be configured to calculate the location and/or orientation of the gNB 110*a* and store the values. For example, the LMF 120 may be configured to store the location of the antenna utilized to obtain the UL-SRS measurements (e.g., lat/long/alt, or other coordinates), and the coordinate system transformation values (e.g., alpha (α), beta (β), gamma (γ)). In future UE assisted mission-mode positioning, the LMF 120 may be configured to apply the location and/or orientation information to calculate a position estimate for a UE. In an example, the UE and gNB may not be aware of the coordinate system transformation values. For UE based mission-mode positioning, the LMF 120 may compensate the measurements obtained from the affected gNB and provide the compensated measurement results to the UE.

Figure 14:
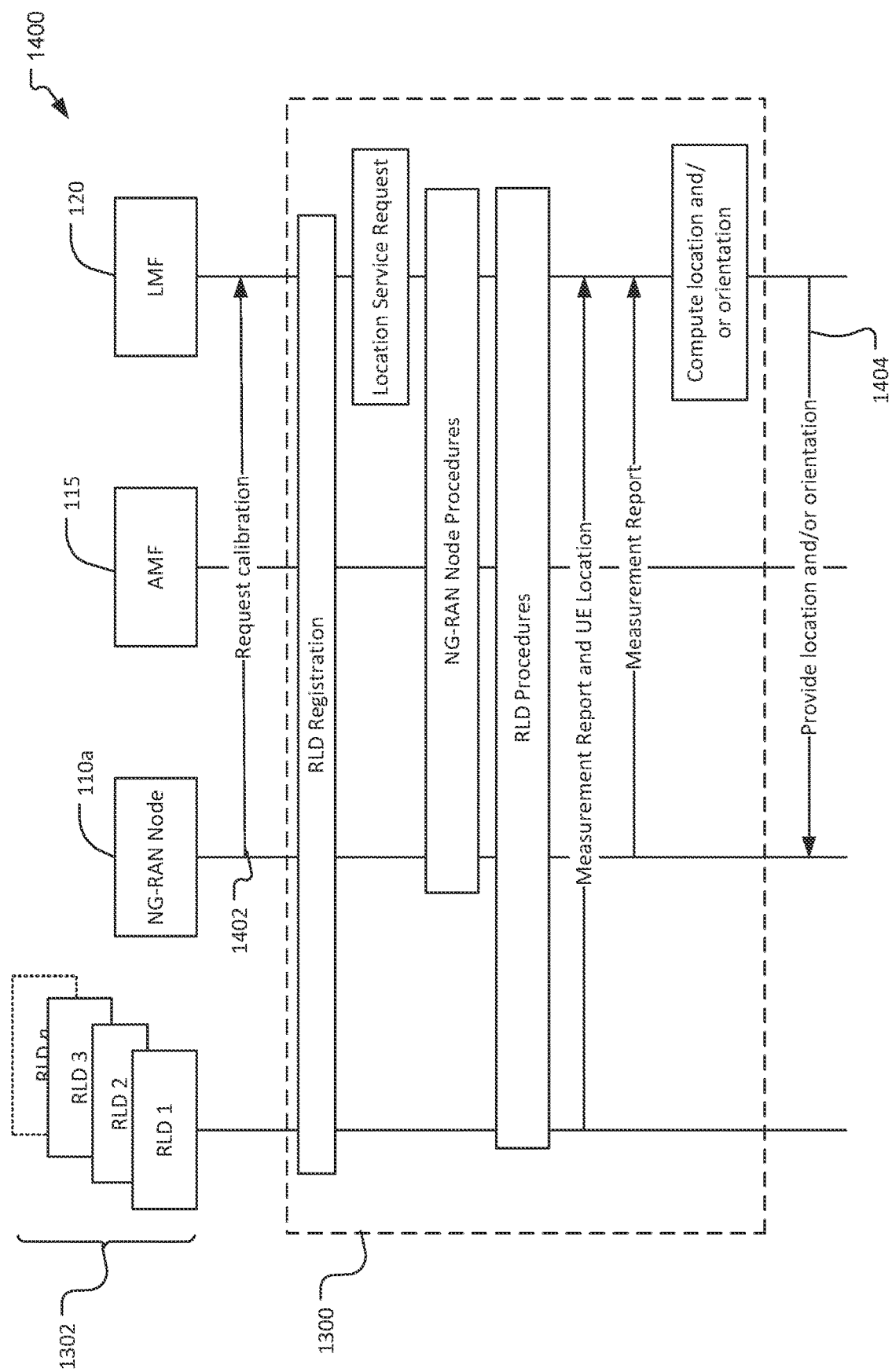
FIG. 14 is an example message flow for calibrating base station location and orientation information.

Referring to FIG. 14, with further reference to FIGS. 1-13, an example message flow 1400 for calibrating base station location and orientation information is shown. The message flow 1400 may utilize the positioning protocols discussed in the message flows 1200 and 1300 for calibrating the location and orientation information. The message flow 1400 is an example, as stages may be added, rearranged, and/or removed. The message flow 1400 may include a plurality of RLDs 1302, a station requesting calibration such as the gNB 110*a*, the AMF 115, and the LMF 120. A BS such as the gNB 110*a* may determine that a location and orientation calibration procedure is required. For example, a BS installation may be modified or upgraded to include new antenna modules. Anemometers, accelerometers, gyroscopes, or other sensors may detect environmental factors such as windspeed, or other geological events (e.g., tremors) which may impact the location and/or orientation an antenna. Other trigger conditions, such as decreased signal strength, increased reflected power, and increased signal noise may be used to initiate a calibration procedure. In an example, the calibration procedure may be schedule periodically (e.g., hourly, daily, weekly, etc.). The gNB 110*a* may send a request calibration message 1402 via the NRPPa protocol to initiate a base station location and orientation computation procedure. In an example, the request calibration message 1402 may initiate the message flow 1300, and the LMF 120 may compute the location and orientation information as described in FIG. 13. The LMF 120 may also provide the location and/or orientation information to the gNB 110*a* in one or more response messages 1404. In an example, the gNB 110*a* may be configured to update information elements and data structure elements such as a TRPLocationInfo field, a RelativeLocation field, or a ReferencePointLocation3D field based on the computed location and/or orientation information (e.g., 3GPP TS 137.355 rev. 16). The gNB 110*a* may be configured to update these fields and provide the updated information to other network nodes.

Figure 15:
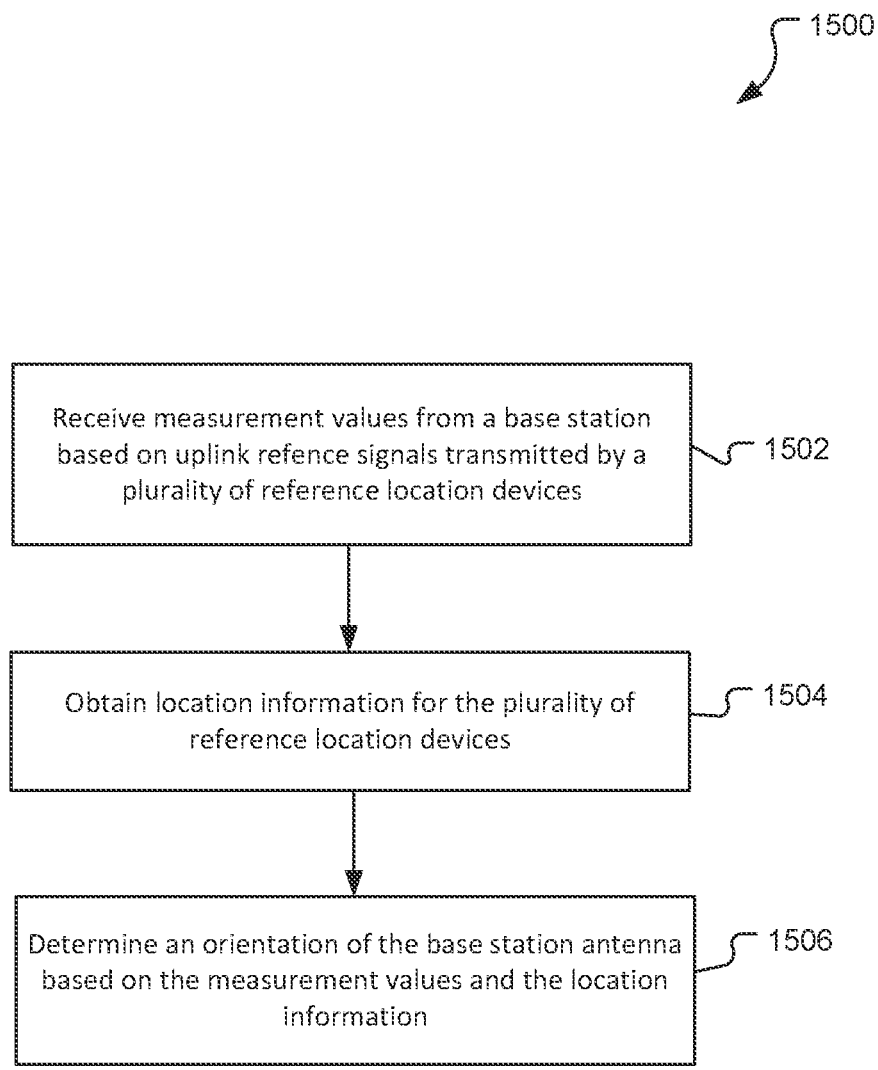
FIG. 15 is a block flow diagram of an example method for determining an orientation of a base station antenna with a network server.

Referring to FIG. 15, with further reference to FIGS. 1-14, a method 1500 of determining an orientation of a base station antenna with a network server includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving measurement values from a base station based on uplink reference signals transmitted by a plurality of reference location devices. A server 400, such as the server 150 or the LMF 120, including a processor 410 and a transceiver 415, is a means for receiving the measurement values. The RLDs may be configured to transmit uplink reference signals, such as UL-SRS for positioning or other uplink reference signals, which are measured by the base station. The measurements may include AoA and ZoA values for each of the reference signals transmitted by the RLDs. Other measurements, such as RTT values may also be measured based on message exchanges between the base station and the respective RLDs. The base station, such as the gNB 110*a*, may provide the measurement values in one or more measurement report messages 1316 described in FIG. 13. For example, the measurement values may be included in one or more information elements provided to the LMF 120 via the NRPPa protocol, or other signaling techniques.

At stage 1504, the method includes obtaining location information for the plurality of reference location devices. The server 400, including the processor 410 and the transceiver 415, is a means for obtaining the location information. In an example, the RLDs may provide their respective location information to the LMF 120 via LPP messages, such as the measurement report and location information messages 1312. The location information may be provided to the LMF 120 via other stations, such as the gNB 110*a*, or the AMF 115. In an example, the RLDs may be in a fixed location and their location information may be included in an almanac, or other data structure, stored on a network server and the LMF 120 may be configured to query the network server for the location information.

At stage 1506, the method includes determining an orientation of the base station antenna based on the measurement values and the location information. The server 400, including the processor 410, is a means for determining the orientation of the base station antenna. In an example, the LMF 120 may be configured to utilize the location of the base station and the locations of the RLDs to determine a GCS (i.e., based on the true locations). The AoA and ZoA measurements based on the UL-SRSs received by the base station may be used to determine a LCS (e.g., based on the orientation of the base station). The LMF 120 may determine coordinate system transformation values (e.g., alpha ($\alpha$), beta ($\beta$), gamma ($\gamma$)) based on the GCS and the LCS using coordinate transformation algorithms as known in the art (e.g., 3GPP TR 38.901, clause 7.1.3 V16.1.0 (2019 December)). In an example, the LMF 120 may utilize measurements from three RLDs to determine the location of the base station, and the measurements from three additional RLDs to determine the orientation.

In an embodiment, the method may include determining a plurality of reference location devices required to perform a calibration procedure. A server 400, such as the LMF 120 including a processor 410 and a transceiver 415, is a means for determining the number of RLDs. In general, an RLD may be a UE, BS, or other wire nodes at known locations and configured to transmit reference signals. In an example, referring to FIG. 10, three RLDs may be selected to perform an orientation procedure if the location of the base station is known. In an example, referring to FIG. 11, six RLDs may be selected to determine the location and orientation of the base station. The LMF 120 may utilize DOP procedures to select the RLDs. For example, the RLDs may be selected based on relative geographic positions (e.g., angle diversity) and/or signal performance (e.g., signal strength, line-of-sight path).

In an embodiment, the method may include configuring the plurality of reference location devices to transmit uplink reference signals to the base station. The server 400, including the processor 410 and the transceiver 415, is a means for configuring the RLDs. In an example, the LMF 120 may be configured to utilize the NR-RAN node procedures to provide instructions to the RLDs. Other signaling may be used to provide instructions to the RLDs. In an example, the RLDs may be configured to relay instructions to neighboring nodes via a D2D sidelink.

Figure 16:
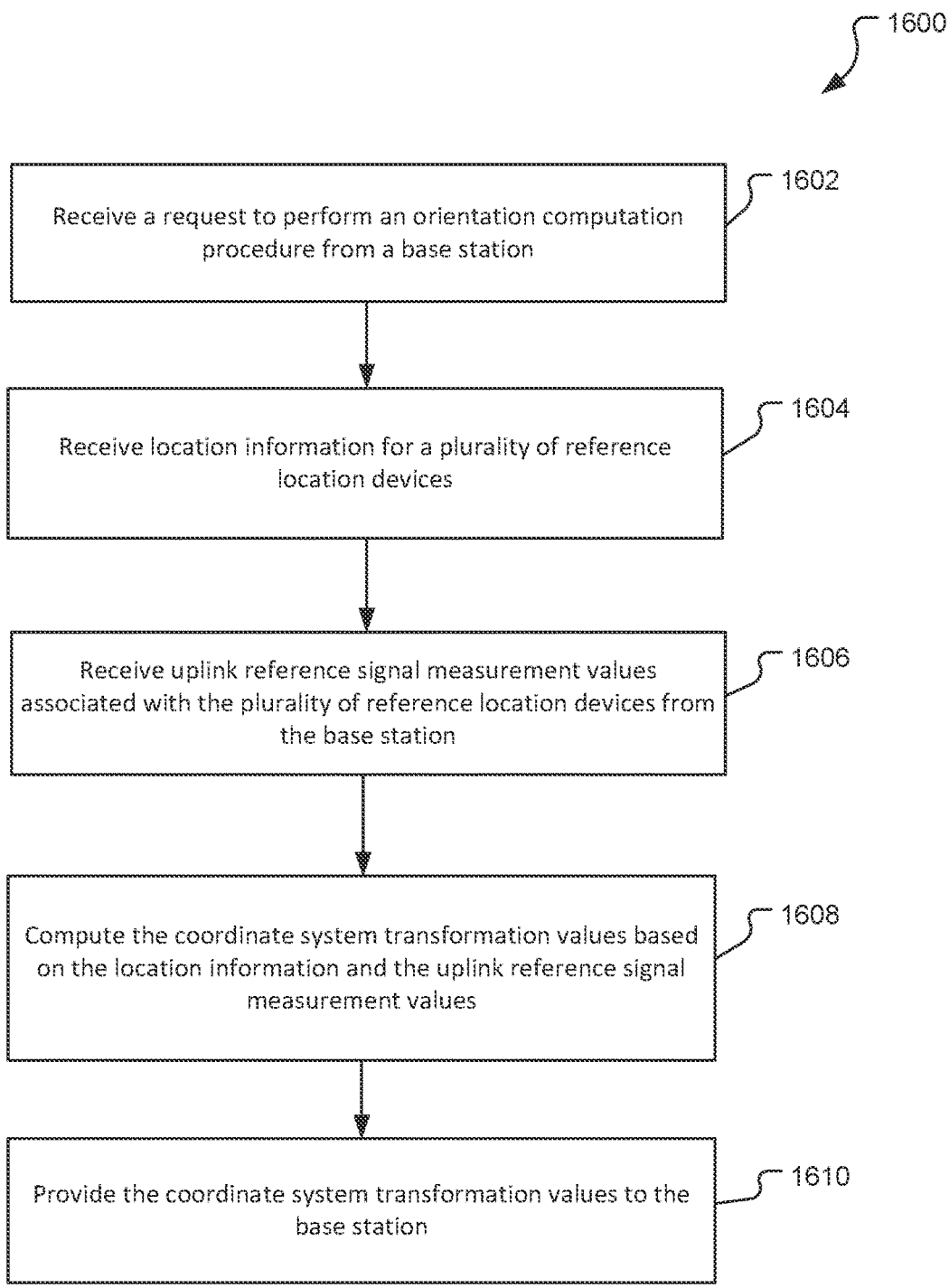
FIG. 16 is a block flow diagram of an example method performed on a network server for providing coordinate system transformation values to a base station.

Referring to FIG. 16, with further reference to FIGS. 1-14, a method 1600 performed on a server for providing coordinate system transformation values to a base station includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes receiving a request to perform an orientation procedure from a base station. A server 400, such as the server 150 or the LMF 120, including a processor 410 and a transceiver 415, is a means for receiving a request to perform an orientation procedure. In an example, a base station may determine that a location and/or orientation calibration procedure is required. The requirement may be driven by operational and/or environmental factors such as system modifications, upgrades, potential wind damage (e.g., causing a displacement in the antenna orientation), or other trigger conditions such as decreased signal strength, increased reflected power, and increased signal noise which may indicate a change in an antenna system. In an example, the request may be provided based on a periodic schedule (e.g., hourly, daily, weekly, etc.). The base station may be configured to send a request calibration message to the LMF 120 via the NRPPa protocol to initiate a base station location and orientation computation procedure. For example, in a disaggregated RAN, the CU 113 may be configured send request to perform the orientation procedure.

At stage 1604, the method includes receiving location information for a plurality of reference location devices. The server 400, including the processor 410 and the transceiver 415, is a means for receiving location information from the plurality of RLDs. In an example, the LMF 120 may be configured to initiate a positioning protocol, such as described in FIG. 12, to obtain location information from the plurality of RLDs. In an example, the RLDs may be configured to determine their locations based on a satellite navigation system (e.g., GPS) and to provide their respective location information to the LMF 120. The LMF 120 may be configured to provide location request messages via LPP, or other network signaling protocols, to the RLDs to obtain their current location information. In an example, the RLDs may provide location information to the LMF 120 on a periodic basis. The location of one or more RLDs may be included in an almanac or other data structure, and the LMF 120 may be configured to query the data structure to determine the location information for the RLDs. In an example, referring to FIG. 10, the location information from three RLDs may be used to perform an orientation procedure if the location of the base station is known. In an example, referring to FIG. 11, the location information from six RLDs may be used to determine the location and orientation of the base station.

At stage 1606, the method includes receiving uplink reference signal measurement values associated with the plurality of reference location devices from the base station. The server 400, including the processor 410 and the transceiver 415, is a means for receiving position reference signal measurement values. In an example, the LMF 120 may receive measurement reports via NRPPa or other signaling protocols. The measurement reports may include AoA and ZoA values based on uplink reference signals transmitted by the RLDs. In an example, the measurement reports may include other measurement values such as RTT, RSRP, RSRQ, RSTD information based on the uplink reference signals transmitted from the RLDs. The base station (e.g., CU 113) may be configure to send the uplink reference signal measurement values.

At stage 1608, the method includes computing coordinate system transformation values based on the location information and the uplink reference signal measurement values. The server 400, including the processor 410, is a means for computing coordinate system transformation values. In an example, the LMF 120 may be configured to utilize the location of the base station and the locations of the RLDs to determine a GCS (i.e., based on the true locations). The AoA and ZoA measurements based on the UL-SRSs received by the base station may be used to determine a LCS (e.g., based on the orientation of the base station). The LMF 120 may determine coordinate system transformation values (e.g., alpha ($\alpha$), beta ($\beta$), gamma ($\gamma$)) based on the GCS and the LCS using coordinate transformation algorithms as known in the art (e.g., 3GPP TR 38.901, clause 7.1.3 V16.1.0 (2019 December)). In an example, the LMF 120 may utilize measurements from three RLDs to determine the location of the base station, and the measurements from three additional RLDs to determine the orientation.

At stage 1610, the method includes providing the coordinate system transformation values to the base station. The server 400, including the processor 410 and the transceiver 415, is a means for providing the coordinate system transformation values. In an example, referring to FIG. 14, the LMF 120 may be configured to provide the location and/or orientation information to the base station in one or more response messages 1404. The base station may be configured to update information elements and data structure elements such as a TRPLocationInfo field, a RelativeLocation field, or a ReferencePointLocation3D field based on the computed location and/or orientation information and utilize these fields to provide the updated information to other network nodes.

Figure 17:
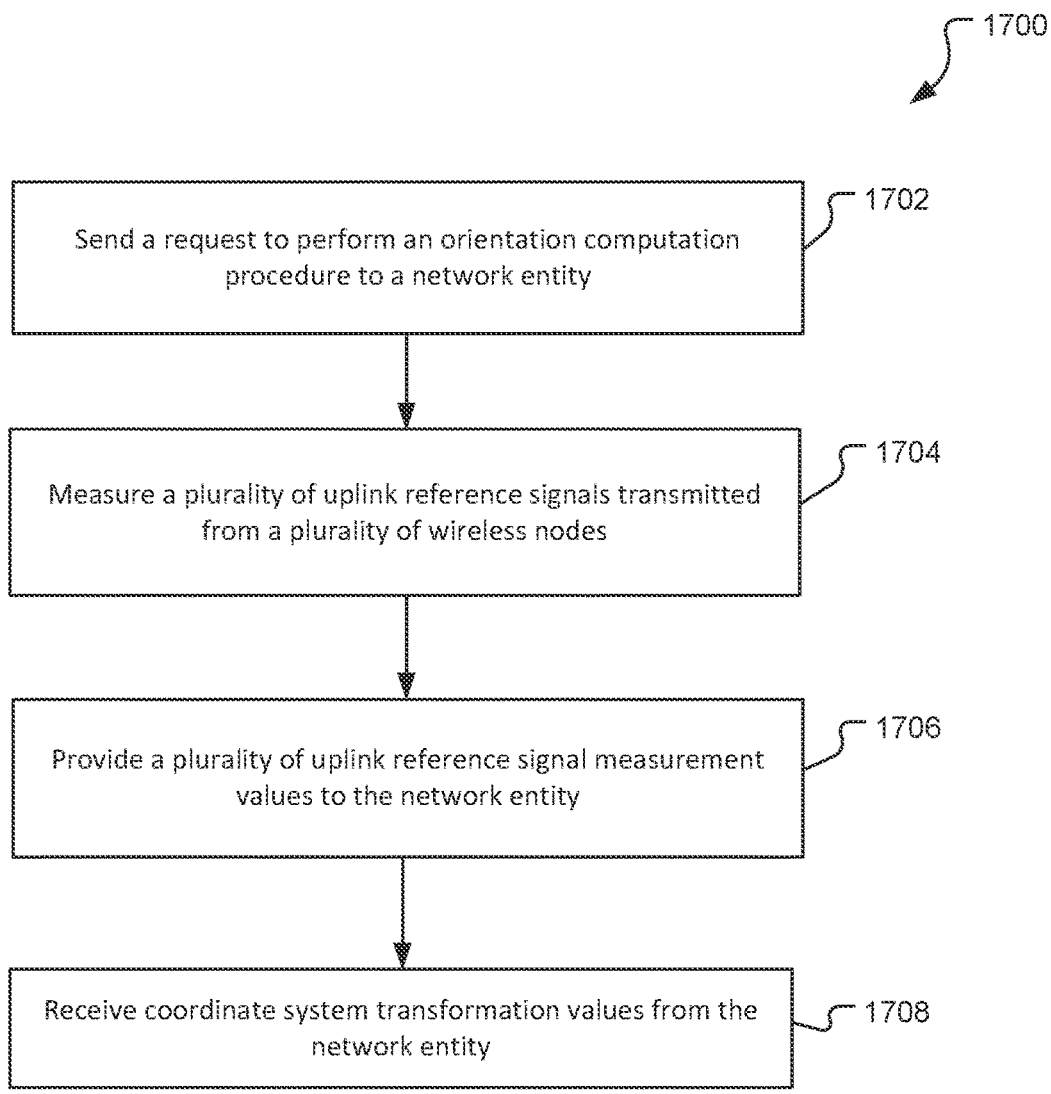
FIG. 17 is a block flow diagram of an example method for requesting location and orientation information for a base station antenna.

Referring to FIG. 17, with further reference to FIGS. 1-14, a method 1700 for requesting location and orientation information for a base station antenna includes the stages shown. The method 1700 is, however, an example and not limiting. The method 1700 may be altered, e.g., by having stages added, removed, rearranged, combined, performed concurrently, and/or having single stages split into multiple stages.

At stage 1702, the method includes sending a request to perform an orientation procedure to a network entity. A TRP 300, such as the gNB 110*a* including a processor 310 and a transceiver 315, is a means for sending a request to perform an orientation procedure. The TRP 300 may determine that a location and/or orientation calibration procedure is required. In an example, the CU 113 in a gNB may be configured to determine the calibration is required. The requirement may be driven by a calibration event associated with operational and/or environmental factors such as system modifications, upgrades, potential wind damage (e.g., causing a displacement in the antenna orientation), or other trigger conditions such as decreased signal strength, increased reflected power, and increased signal noise which may indicate a change in an antenna system. The TRP 300 may be configured to detect such a calibration event and send a request to perform the orientation procedure. In an example, the request may be provided based on a periodic schedule (e.g., hourly, daily, weekly, etc.). In an example, referring to FIG. 14, the request may be sent via a request calibration message to the LMF 120 via the NRPPa protocol to initiate a base station location and orientation computation procedure.

At stage 1704, the method includes measuring a plurality of uplink reference signals transmitted from a plurality of wireless nodes. The TRP 300, including the processor 310 and the transceiver 315, is a means for measuring a plurality of uplink reference signals. The wireless nodes may be RLDs, UEs, BSs, or other wireless nodes configured to transmit reference signals, such as UL-SRS for positioning, which are measured by the TRP 300. The measurements may include AoA and ZoA values for each of the reference signals transmitted by the wireless nodes. Other measurements, such as RTT, RSRP, RSRQ, and ULTDOA values may also be measured based on message exchanges between the TRP 300 and the respective wireless nodes.

At stage 1706, the method includes providing a plurality of uplink reference signal measurement values to the network entity. The TRP 300, including the processor 310 and the transceiver 315, is a means for providing the plurality of uplink reference signal measurement values. In an example, the measurement values may be associated with a LCS based on the location and orientation of the antenna on the TRP 300. The TRP 300 may provide the measurement values in one or more measurement report messages 1316 described in FIG. 13. For example, the measurement values may be included in one or more information elements provided to the network entity via the NRPPa protocol, or other signaling techniques. In an example, referring to FIG. 10, the TRP may provide measurement values associated with three wireless nodes may be provided to the network entity to perform an orientation procedure if the location of the base station is known, and measurement values associated with six wireless nodes may be provided to determine the location and orientation of the base station.

At stage 1708, the method includes receiving coordinate system transformation values from the network entity. The TRP 300, including the processor 310 and the transceiver 315, is a means for receiving the coordinate system transformation values. In an example, referring to FIG. 14, the network entity may be configured to provide the coordinate system transformation values to the TRP 300 in one or more response messages 1404. The network entity is configured to determine coordinate system transformation values (e.g., alpha ($\alpha$), beta ($\beta$), gamma ($\gamma$)) based on the GCS and the LCS using coordinate transformation algorithms as known in the art (e.g., 3GPP TR 38.901, clause 7.1.3 V16.1.0 (2019 December)). The TRP 300 may be configured to receive the coordinate system transformation values and may update data structure elements such as a TRPLocationInfo field, a RelativeLocation field, or a ReferencePointLocation3D field based on the coordinate system transformation values.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of determining an orientation of a base station antenna with a network server, comprising:
receiving measurement values from a base station based on uplink reference signals transmitted by a plurality of reference location devices;
obtaining location information for the plurality of reference location devices; and
determining the orientation of the base station antenna based on the measurement values and the location information.

2. The method of clause 1 wherein the measurement values are based on a local coordinate system.

3. The method of clause 1 wherein the location information is based on a global coordinate system.

4. The method of clause 1 wherein determining the orientation of the base station antenna includes computing coordinate system transformation values based on the measurement values and the location information.

5. The method of clause 1 further comprising determining a location of the base station antenna based on the measurement values and the location information.

6. The method of clause 1 further comprising providing an indication of the orientation of the base station antenna to the base station.

7. The method of clause 1 further comprising providing an indication of the orientation of the base station antenna to a user equipment.

8. The method of clause 1 wherein at least one of the plurality of reference location devices is a user equipment.

9. The method of clause 1 further comprising receiving a request to determine the orientation of the base station antenna from the base station.

10. The method of clause 1 wherein the measurement values includes at least an angle of arrival for the uplink reference signals.

11. A method performed on a network server for providing coordinate system transformation values to a base station, comprising:
receiving a request to perform an orientation computation procedure from the base station;
receiving location information for a plurality of reference location devices;
receiving uplink reference signal measurement values associated with the plurality of reference location devices from the base station;
computing the coordinate system transformation values based on the location information and the uplink reference signal measurement values; and
providing the coordinate system transformation values to the base station.

12. The method of clause 11 wherein the request to perform the orientation computation procedure is received periodically.

13. The method of clause 11 wherein the location information is based on a global coordinate system.

14. The method of clause 11 wherein the uplink reference signal measurement values are based on a local coordinate system.

15. The method of clause 14 wherein the uplink reference signal measurement values include at least an angle of arrival value associated with each of the plurality of reference location devices.

16. The method of clause 11 further comprising:
obtaining a plurality of positioning measurements from a user equipment, wherein at least one positioning measurement is based on a signal received from the base station; and
determining a location of the user equipment based at least in part on the plurality of positioning measurements and the coordinate system transformation values.

17. The method of clause 11 wherein at least one of the plurality of reference location devices is a user equipment.

18. The method of clause 11 further comprising providing the coordinate system transformation values to a user equipment.

19. The method of clause 11 further comprising:
determining a location of an antenna associated with the base station based on the location information and the uplink reference signal measurement values; and
providing the location of the antenna associated with the base station to the base station.

20. A method for requesting location and orientation information for a base station antenna, comprising:
sending a request to perform an orientation computation procedure to a network entity;
measuring a plurality of uplink reference signals transmitted from a plurality of wireless nodes;
providing a plurality of uplink reference signal measurement values to the network entity; and
receiving coordinate system transformation values from the network entity.

21. The method of clause 20 further comprising sending the request to perform the orientation computation procedure periodically.

22. The method of clause 20 further comprising detecting a calibration event and sending the request to perform the orientation computation procedure in response to detecting the calibration event.

23. The method of clause 20 further comprising receiving location information for the base station antenna from the network entity.

24. The method of clause 20 wherein at least one of the plurality of wireless nodes is a user equipment.

25. The method of clause 20 wherein the plurality of uplink reference signal measurement values includes an angle of arrival value for each of the plurality of uplink reference signal measurement values.

26. The method of clause 20 further comprising providing the coordinate system transformation values to a user equipment.

27. An apparatus, comprising:
a memory;
at least one transceiver;
at least one processor communicatively coupled to the memory and the at least one transceiver, and configured to:
receive measurement values from a base station based on uplink reference signals transmitted by a plurality of reference location devices;
obtain location information for the plurality of reference location devices; and
determine an orientation of a base station antenna based on the measurement values and the location information.

28. The apparatus of clause 27 wherein the measurement values are based on a local coordinate system.

29. The apparatus of clause 27 wherein the location information is based on a global coordinate system.

30. The apparatus of clause 27 wherein the at least one processor is further configured to compute coordinate system transformation values based on the measurement values and the location information.

31. The apparatus of clause 27 wherein the at least one processor is further configured to determine a location of the base station antenna based on the measurement values and the location information.

32. The apparatus of clause 27 wherein the at least one processor is further configured to provide an indication of the orientation of the base station antenna to the base station.

33. The apparatus of clause 27 wherein the at least one processor is further configured to provide an indication of the orientation of the base station antenna to a user equipment.

34. The apparatus of clause 27 wherein at least one of the plurality of reference location devices is a user equipment.

35. The apparatus of clause 27 wherein the at least one processor is further configure to receive a request to determine the orientation of the base station antenna from the base station.

36. The apparatus of clause 27 wherein the measurement values includes at least an angle of arrival for the uplink reference signals.

37. An apparatus, comprising:
a memory;
at least one transceiver;
at least one processor communicatively coupled to the memory and the at least one transceiver, and configured to:
receive a request to perform an orientation computation procedure from a base station;
receive location information for a plurality of reference location devices;
receive uplink reference signal measurement values associated with the plurality of reference location devices from the base station;
compute coordinate system transformation values based on the location information and the uplink reference signal measurement values; and
provide coordinate system transformation values to the base station.

38. The apparatus of clause 37 wherein the request to perform the orientation computation procedure is received periodically.

39. The apparatus of clause 37 wherein the location information is based on a global coordinate system.

40. The apparatus of clause 37 wherein the uplink reference signal measurement values are based on a local coordinate system.

41. The apparatus of clause 40 wherein the uplink reference signal measurement values include at least an angle of arrival value associated with each of the plurality of reference location devices.

42. The apparatus of clause 37 wherein the at least one processor is further configured to:
obtain a plurality of positioning measurements from a user equipment, wherein at least one positioning measurement is based on a signal received from the base station; and
determine a location of the user equipment based at least in part on the plurality of positioning measurements and the coordinate system transformation values.

43. The apparatus of clause 37 wherein at least one of the plurality of reference location devices is a user equipment.

44. The apparatus of clause 37 wherein the at least one processor is further configured to provide the coordinate system transformation values to a user equipment.

45. The apparatus of clause 37 wherein the at least one processor is further configured to:
determine a location of an antenna associated with the base station based on the location information and the uplink reference signal measurement values; and
provide the location of the antenna associated with the base station to the base station.

46. An apparatus, comprising:
a memory;
at least one transceiver;
at least one processor communicatively coupled to the memory and the at least one transceiver, and configured to:
send a request to perform an orientation computation procedure to a network entity;
measure a plurality of uplink reference signals transmitted from a plurality of wireless nodes;
provide a plurality of uplink reference signal measurement values to the network entity; and
receive coordinate system transformation values from the network entity.

47. The apparatus of clause 46 wherein the at least one processor is further configured to send the request to perform the orientation computation procedure periodically.

48. The apparatus of clause 46 wherein the at least one processor is further configured to detect a calibration event and send the request to perform the orientation computation procedure in response to detecting the calibration event.

49. The apparatus of clause 46 the at least one processor is further configured to receive location information for a base station antenna from the network entity.

50. The apparatus of clause 46 wherein at least one of the plurality of wireless nodes is a user equipment.

51. The apparatus of clause 46 wherein the at least one processor is further configured to determine an angle of arrival value for each of the plurality of uplink reference signal measurement values.

52. The apparatus of clause 46 wherein the at least one processor is further configured to provide the coordinate system transformation values to a user equipment.

53. An apparatus for determining an orientation of a base station antenna with a network server, comprising:
means for receiving measurement values from a base station based on uplink reference signals transmitted by a plurality of reference location devices;
means for obtaining location information for the plurality of reference location devices; and
means for determining the orientation of the base station antenna based on the measurement values and the location information.

54. An apparatus for providing coordinate system transformation values to a base station, comprising:
means for receiving a request to perform an orientation computation procedure from the base station;
means for receiving location information for a plurality of reference location devices;
means for receiving uplink reference signal measurement values associated with the plurality of reference location devices from the base station;
means for computing the coordinate system transformation values based on the location information and the uplink reference signal measurement values; and
means for providing the coordinate system transformation values to the base station.

55. An apparatus for requesting location and orientation information for a base station antenna, comprising:
  means for sending a request to perform an orientation computation procedure to a network entity;
  means for measuring a plurality of uplink reference signals transmitted from a plurality of wireless nodes;
  means for providing a plurality of uplink reference signal measurement values to the network entity; and
  means for receiving coordinate system transformation values from the network entity.

56. A non-transitory processor-readable storage medium comprising processor-readable instructions configured to cause one or more processors to determine an orientation of a base station antenna with a network server, comprising:
  code for receiving measurement values from a base station based on uplink reference signals transmitted by a plurality of reference location devices;
  code for obtaining location information for the plurality of reference location devices; and
  code for determining the orientation of the base station antenna based on the measurement values and the location information.

57. A non-transitory processor-readable storage medium comprising processor-readable instructions configured to cause one or more processors to provide coordinate system transformation values to a base station, comprising:
  code for receiving a request to perform an orientation computation procedure from the base station;
  code for receiving location information for a plurality of reference location devices;
  code for receiving uplink reference signal measurement values associated with the plurality of reference location devices from the base station;
  code for computing the coordinate system transformation values based on the location information and the uplink reference signal measurement values; and
  code for providing the coordinate system transformation values to the base station.

58. A non-transitory processor-readable storage medium comprising processor-readable instructions configured to cause one or more processors to request location and orientation information for a base station antenna, comprising:
  code for sending a request to perform an orientation computation procedure to a network entity;
  code for measuring a plurality of uplink reference signals transmitted from a plurality of wireless nodes;
  code for providing a plurality of uplink reference signal measurement values to the network entity; and
  code for receiving coordinate system transformation values from the network entity.

The invention claimed is:

1. A method of determining an orientation of a base station antenna with a network server, comprising:
  receiving measurement values from a base station based on uplink reference signals transmitted by a plurality of reference location devices;
  obtaining location information for the plurality of reference location devices; and
  determining the orientation of the base station antenna based on the measurement values and the location information.

2. The method of claim 1 wherein the measurement values are based on a local coordinate system.

3. The method of claim 1 wherein the location information is based on a global coordinate system.

4. The method of claim 1 wherein determining the orientation of the base station antenna includes computing coordinate system transformation values based on the measurement values and the location information.

5. The method of claim 1 further comprising determining a location of the base station antenna based on the measurement values and the location information.

6. The method of claim 1 further comprising providing an indication of the orientation of the base station antenna to the base station.

7. The method of claim 1 further comprising providing an indication of the orientation of the base station antenna to a user equipment.

8. The method of claim 1 wherein at least one of the plurality of reference location devices is a user equipment.

9. The method of claim 1 further comprising receiving a request to determine the orientation of the base station antenna from the base station.

10. The method of claim 1 wherein the measurement values includes at least an angle of arrival for the uplink reference signals.

11. A method for requesting location and orientation information for a base station antenna, comprising:
  sending a request to perform an orientation computation procedure to a network entity;
  measuring a plurality of uplink reference signals transmitted from a plurality of wireless nodes;
  providing a plurality of uplink reference signal measurement values to the network entity; and
  receiving coordinate system transformation values from the network entity.

12. The method of claim 11 further comprising sending the request to perform the orientation computation procedure periodically.

13. The method of claim 11 further comprising detecting a calibration event and sending the request to perform the orientation computation procedure in response to detecting the calibration event.

14. The method of claim 11 wherein at least one of the plurality of wireless nodes is a user equipment.

15. The method of claim 11 further comprising providing the coordinate system transformation values to a user equipment.

16. An apparatus, comprising:
  a memory;
  at least one transceiver;
  at least one processor communicatively coupled to the memory and the at least one transceiver, and configured to:
    receive measurement values from a base station based on uplink reference signals transmitted by a plurality of reference location devices;
    obtain location information for the plurality of reference location devices; and
    determine an orientation of a base station antenna based on the measurement values and the location information.

17. The apparatus of claim 16 wherein the measurement values are based on a local coordinate system.

18. The apparatus of claim 16 wherein the location information is based on a global coordinate system.

19. The apparatus of claim 16 wherein the at least one processor is further configured to compute coordinate system transformation values based on the measurement values and the location information.

20. The apparatus of claim 16 wherein the at least one processor is further configured to determine a location of the base station antenna based on the measurement values and the location information.

21. The apparatus of claim 16 wherein the at least one processor is further configured to provide an indication of the orientation of the base station antenna to the base station.

22. The apparatus of claim 16 wherein the at least one processor is further configured to provide an indication of the orientation of the base station antenna to a user equipment.

23. The apparatus of claim 16 wherein at least one of the plurality of reference location devices is a user equipment.

24. The apparatus of claim 16 wherein the at least one processor is further configure to receive a request to determine the orientation of the base station antenna from the base station.

25. An apparatus, comprising:
a memory;
at least one transceiver;
at least one processor communicatively coupled to the memory and the at least one transceiver, and configured to:
  send a request to perform an orientation computation procedure to a network entity;
  measure a plurality of uplink reference signals transmitted from a plurality of wireless nodes;
  provide a plurality of uplink reference signal measurement values to the network entity; and
  receive coordinate system transformation values from the network entity.

26. The apparatus of claim 25 wherein the at least one processor is further configured to send the request to perform the orientation computation procedure periodically.

27. The apparatus of claim 25 wherein the at least one processor is further configured to detect a calibration event and send the request to perform the orientation computation procedure in response to detecting the calibration event.

28. The apparatus of claim 25 the at least one processor is further configured to receive location information for a base station antenna from the network entity.

29. The apparatus of claim 25 wherein the at least one processor is further configured to determine an angle of arrival value for each of the plurality of uplink reference signal measurement values.

30. The apparatus of claim 25 wherein the at least one processor is further configured to provide the coordinate system transformation values to a user equipment.

* * * * *